United States Patent
Goldman

(10) Patent No.: US 11,669,917 B1
(45) Date of Patent: *Jun. 6, 2023

(54) NEWS ALERTS BASED ON USER ANALYTICS

(71) Applicant: The Deal, L.L.C., London (GB)

(72) Inventor: Neal Goldman, New York, NY (US)

(73) Assignee: The Deal, L.L.C., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/171,997

(22) Filed: Feb. 9, 2021

Related U.S. Application Data

(63) Continuation of application No. 16/278,007, filed on Feb. 15, 2019, now Pat. No. 10,915,975, which is a continuation of application No. 15/806,257, filed on Nov. 7, 2017, now Pat. No. 10,210,587, which is a continuation of application No. 14/336,915, filed on Jul. 21, 2014, now Pat. No. 9,811,866.

(60) Provisional application No. 61/864,367, filed on Aug. 9, 2013, provisional application No. 61/856,701, filed on Jul. 20, 2013.

(51) Int. Cl.
*G06F 7/00* (2006.01)
*G06Q 50/00* (2012.01)
*G06F 16/951* (2019.01)
*G06F 16/9535* (2019.01)

(52) U.S. Cl.
CPC .......... *G06Q 50/01* (2013.01); *G06F 16/951* (2019.01); *G06F 16/9535* (2019.01)

(58) Field of Classification Search
CPC .... G06F 16/9535; G06F 16/951; G06Q 50/01
USPC ................... 707/737, 756, 798, 736
See application file for complete search history.

(56) References Cited

U.S. PATENT DOCUMENTS

| | | |
|---|---|---|
| 8,180,804 B1 | 5/2012 | Narayanan et al. |
| 8,185,558 B1 | 5/2012 | Narayanan et al. |
| 8,386,482 B2 | 2/2013 | Gopalakrishnan |
| 8,443,005 B1 | 5/2013 | Goldman et al. |
| 2003/0187813 A1 | 10/2003 | Goldman et al. |
| 2005/0027797 A1 | 2/2005 | San Andres et al. |
| 2006/0020886 A1 | 1/2006 | Agarwal et al. |
| 2006/0075335 A1 | 4/2006 | Gloor |
| 2006/0136419 A1 | 6/2006 | Brydon et al. |
| 2006/0195442 A1 | 8/2006 | Cone et al. |
| 2007/0124291 A1 | 5/2007 | Hassan et al. |
| 2008/0070495 A1 | 3/2008 | Stricklen et al. |
| 2008/0071796 A1 | 3/2008 | Ghuneim et al. |
| 2008/0086343 A1 | 4/2008 | Pendergraf et al. |
| 2008/0288277 A1 | 11/2008 | Fasciano |
| 2009/0018918 A1 | 1/2009 | Moneypenny et al. |

(Continued)

OTHER PUBLICATIONS

U.S. Appl. No. 13/548,191, filed Jul. 12, 2012, (see file history incl. office action with notification date of Jan. 27, 2014).

(Continued)

*Primary Examiner* — Md I Uddin
(74) *Attorney, Agent, or Firm* — Aka Chan LLP

(57) ABSTRACT

A system gathers information on important and influential people and builds a social graph. The system regularly sends news alert messages to users. This can help users nurture their relationship with persons they are connected to, by providing them with updates on news and other events that happen to persons they are connected to. The watch can be customized with a variety of options, such as including related entities, organizing news alerts with user data, and other options.

20 Claims, 17 Drawing Sheets

(56) References Cited

U.S. PATENT DOCUMENTS

| | | |
|---|---|---|
| 2009/0027392 A1 | 1/2009 | Jadhav et al. |
| 2009/0106822 A1 | 4/2009 | Obasanjo et al. |
| 2009/0228296 A1 | 9/2009 | Ismalon |
| 2009/0259599 A1 | 10/2009 | Wallman |
| 2010/0082695 A1 | 4/2010 | Hardt |
| 2010/0119053 A1 | 5/2010 | Goeldi |
| 2010/0153185 A1 | 6/2010 | Ghosh et al. |
| 2010/0241638 A1 | 9/2010 | O'Sullivan et al. |
| 2010/0268719 A1 | 10/2010 | Cormode et al. |
| 2010/0274815 A1 | 10/2010 | Vanasco |
| 2011/0029521 A1 | 2/2011 | Thayne et al. |
| 2011/0037766 A1 | 2/2011 | Judy et al. |
| 2011/0055186 A1 | 3/2011 | Gopalakrishnan |
| 2011/0173046 A1 | 7/2011 | Dey et al. |
| 2011/0295626 A1 | 12/2011 | Chen et al. |
| 2012/0079023 A1 | 3/2012 | Tejada-Gamero et al. |
| 2012/0096002 A1 | 4/2012 | Sheehan et al. |
| 2012/0166348 A1 | 6/2012 | Dyagilev et al. |
| 2012/0209832 A1 | 8/2012 | Neystadt et al. |
| 2012/0215865 A1 | 8/2012 | Sacks et al. |
| 2012/0232998 A1 | 9/2012 | Schoen |
| 2012/0266081 A1 | 10/2012 | Kao |
| 2012/0303703 A1 | 11/2012 | Richter et al. |
| 2012/0317088 A1 | 12/2012 | Pantel et al. |
| 2013/0019262 A1 | 1/2013 | Bhatia et al. |
| 2013/0135314 A1 | 5/2013 | Haggerty et al. |

OTHER PUBLICATIONS

U.S. Appl. No. 13/547,851, filed Jul. 12, 2012, (see file history incl. office action with notification date of Jan. 27, 2014 and advisory action with notification date of Apr. 14, 2014).

U.S. Appl. No. 13/225,380, filed Sept. 2, 2011, (see file history incl. office action with notification date of Feb. 6, 2014).

U.S. Appl. No. 13/224,138, filed Sep. 1,2011, (see file history incl. office action with notification date of Mar. 21, 2014).

"Server definition," The Linux Information Project, created May 16, 2005, retrieved Jan. 23, 2013 from http://www.linfo.org/server.html, one page.

NEWS ALERTS BASED ON USER ANALYTICS

CROSS-REFERENCE TO RELATED APPLICATIONS

This patent application is a continuation of U.S. patent application Ser. No. 16/278,007, filed Feb. 15, 2019, issued as U.S. Pat. No. 10,915,975 on Feb. 9, 2021, which is a continuation of U.S. patent application Ser. No. 15/806,257, filed Nov. 7, 2017, issued as U.S. Pat. No. 10,210,587 on Feb. 19, 2019, which is a continuation of U.S. patent application Ser. No. 14/336,915, filed Jul. 21, 2014, issued as U.S. Pat. No. 9,811,866 on Nov. 7, 2017, which claims the benefit of U.S. patent applications 61/856,701, filed Jul. 20, 2013, and 61/864,367, filed Aug. 9, 2013. These applications are incorporated by reference along with all other references cited in this application.

BACKGROUND OF THE INVENTION

The present invention relates to the field of information management, and more specifically, to providing an information resource where news about information stored is updated and sent to users of the system.

In business, there is an adage: "the right ten minutes in front of the right person is worth more than a year at your desk." This is because it is people that make things happen, and connecting with the right person can give you the resources, access or credibility you may need to advance your business. So it is important for a business person to remain updated on news and other events, that can help them gain the credibility or access they need with others.

Some social networks include Facebook™ and LinkedIn™. Trademarks indicated in this patent application are the property of their respective owners. If the world is a pyramid of people, with the "most important" being at the top, Facebook is the masses at the bottom and LinkedIn is the middle-level managers in the middle. However, there is no social network that caters to the world's most "influential people." These people try to keep a low profile, do not promote themselves, and generally do not want the general public contacting through electronic means. This means that, even if these people have a profile on these sites, they will not spend time completing their profile in great detail and will not update their profiles with new information.

Furthermore, other systems may not have ways to receive news updates on relationships a user already has, but wants to nurture. These systems do not offer a convenient way to follow or "catch up" with persons, especially if these persons do not post updates on social networking sites. Another problem is that these alerts are limited by words selected by a user when they specify whom to follow. For example, a news event is generated when John Smith's wife donates money to a philanthropy benefiting cancer research. However, since John Smith himself is not included in the news event, this may not appear in a news update for John Smith even though a person closely related to him (i.e., his spouse) made a donation.

Therefore, there is a need to provide an information resource where information is continually entered into a robust system that presents news information on entities in an accurate, concise, and digestible way.

BRIEF SUMMARY OF THE INVENTION

A system gathers information on important and influential people and builds a social graph. The information is organized based on this social graph and provided to users as a service. The system continually updates information in the social graph by crawling websites and other sources of information. The system creates an extensive database and technology product that tracks the estimated one and a half million most important or influential people in the United States and in the world. In an implementation, the system is not a social network like Facebook or MySpace. Users or subscribers of the system are not asked to contribute any data, but the users can provide information about themselves so the system can determine any links they might have to the people being tracked. The system uses a vast array of publicly available data sources, both on-line and not on-line, to create deep and rich profiles on people—their business life, their personal life and who they know. This is not just who these people know in a business context, but who are their friends and others who have "real world" influence over them (and vice versa).

In an implementation, the system can gather contacts a user has by connecting to other software, website, or other data sources. These data sources can be resident on the user's computer (e.g., e-mail software address book, instant messenger, data file, address books, or other) or stored separate from the user's computer (e.g., cloud services, social networking sites, on-line address books, e-mail harvesting, on-line messengers, or others). In a specific implementation, the gathered contacts are contacts extracted from an e-mail account (whether e-mails downloaded onto a user's computer or in the cloud) of the user. This includes processing the user's e-mails to extract contacts from the e-mails of the user. Processing can include contacts that are not stored in the user's address book associated with the e-mail account.

For example, the system can detect changes (e.g., new connections, updated information, or other changes) that are made to a person in the social graph. The system can then provide updates to users of what is happening to these persons if they are of interest to the user. These news updates can be transmitted to users according to a user selected interval of time. For example, the system provides news alerts instantaneously, daily, twice weekly, weekly, or other interval of time.

These news alerts can include persons, organizations, or related entities to persons of interest. The system can use the ontology of the system, which defines how different relationships are stored in the system, to provide insightful information on how relationships and how entities are interconnected. This allows the system to provide a fuller picture of activities a person is interested in, by not only including what a news article states, but for entities that have a high degree of closeness to persons of interest.

In an implementation, the system includes: providing a system accessible over the Internet including a social graph, where the social graph includes: nodes of a first type, referred to as system-provided nodes, where system-provided nodes represent entities tracked by the system and include information gathered by the system; nodes of a second type, different from the first type of node and referred to as ghost nodes, where ghost nodes represent entities created for users of the system and include information specified by users of the system; edges of a first type, referred to as system-provided edges, where system-provided edges represent relationships categorized by at least one concept category of the system between two different system-provided nodes of the social graph; and edges of a second type, different from the first type of edge and referred to as ghost edges, where each ghost edges represent relationships between a system-provided node and a ghost node of the social graph, and information on the relationships are specified by users of the system. The system includes receiving at the system information on news events; identifying from the social graph a first, second, and third system-provided nodes specified by the news events; updating the social graph by creating at least two system-provided edges coupling the first and second system-provided nodes by a first system-provided edge and the first and third system-provided nodes by a second system-provided edge; monitoring whether requests by users of the system, represented in the social graph as ghost nodes, have been satisfied based on the first and second system-provided edges; for the plurality of users, setting a plurality of indication flags stored on an indication flags database, where each indication flag is associated with the plurality of users and indicates the requests by the plurality of users of the system have been satisfied; generating news digests for the users, where the news digests includes information represented by the first and second system-provided edges; and transmitting the news digests to the users over the Internet.

In various implementations, the system includes maintaining the social graph including: allowing the system-provided nodes of the social graph to be directly coupled to other system-provided nodes by system-provided edges, where system-provided edges include information gathered by the system and not specified by users; allowing the ghost nodes of the social graph to be directly coupled to system-provided nodes by ghost edges, where ghost edges include information specified by users of the system; disallowing the ghost nodes from being directly coupled to other ghost nodes or to system-provided nodes using system-provided edges; and disallowing the system-provided nodes from being directly coupled to other system-provided nodes using ghost edges, where nodes are directly coupled when they are one degree of separation from each other.

The system can include where the requests by the users includes selecting entities tracked by the system in the social graph, represented as system-provided nodes, by the users. The system can include where for each selected entity by a user, a system-provided node representing the selected entity is coupled to a ghost node representing the user. The system includes where the news events includes news events gathered from an electronic information source, accessible via the Internet. The electronic information source includes a government database.

In an implementation, a first news digest generated for a first user includes a first and second news items and the first news item appears in the first news digest before the second news item, where the first news digest includes: processing usage information of the first user at a first e-mail service; and determining the first news item includes a first entity having a greater importance than the second news item including the second entity, based on the usage information of the first user. The system includes where each ghost node of the social graph is one-degree of separation from at least one system-provided node of the social graph. The system includes where none of the system-provided edges are directly coupled to a ghost node. None of the ghost edges are coupled to more than one system-provided node. The system includes disallowing system-provided edges from directly coupling two ghost nodes or disallowing ghost edges from directly coupling two ghost nodes or two system-provided nodes.

In an implementation, the system includes: providing a system accessible over the Internet including a social graph; receiving at the system information on news events, including news events regarding a first organization tracked by the system; identifying from the social graph a first, second, and third system-provided nodes specified by the news events, where the first system-provided node represents the first organization tracked by the system; updating the social graph by creating at least two system-provided edges coupling the first and second system-provided nodes by a first system-provided edge and the first and third system-provided nodes by a second system-provided edge; monitoring whether requests by users of the system have been satisfied based on the first and second system-provided edges; determining the requests by the users of the system have been satisfied; generating news digests for the users, where the news digests includes information represented by the first and second system-provided edges; and transmitting the news digests to the users over the Internet. The updating the social graph by creating at least two system-provided edges coupling the first and second system-provided nodes by a first system-provided edge and the first and third system-provided nodes by a second system-provided edge further includes receiving unfiltered information from an on-line source including the news events; filtering the unfiltered information to obtain information on entities; filtering the unfiltered information to obtain filtered information on entities; retrieving ontology data structures, where each ontology data structure of ontology data structures include a method of representing a relationship in an unstructured data format to a data format of the social graph, where the data format of the social graph includes entities represented by at least one system-provided edge and at least two system-provided nodes; selecting ontology data structures from the ontology data structures to represent the filtered information on entities; and creating system-provided edges in the social graph to represented the filtered information on entities based on the selected ontology data structures.

In various implementations, the selected ontology data structures specifies a stock sale relationship. The first system-provided edge represents a first person serving on the board of the first organization. The system can include where the news digest are transmitted by e-mail.

In an implementation, the system includes: providing a system accessible over the Internet including a social graph; receiving at the system information on news events, including news events regarding a first person tracked by the system; identifying from the social graph a first, second, and third system-provided nodes specified by the news events, where the first system-provided node represents the first person tracked by the system; updating the social graph by creating at least two system-provided edges coupling the first and second system-provided nodes by a first system-provided edge and the first and third system-provided nodes by a second system-provided edge; monitoring whether requests by users of the system have been satisfied based on the first and second system-provided edges; determining the requests by the users of the system have been satisfied; generating news digests for the users, where the news digests includes information represented by the first and second system-provided edges; and transmitting the news digests to the users over the Internet. The system can include where ghost nodes represent the users, and the ghost nodes are coupled to the first system-provided node, representing the first person. The system includes where a user is represented by a fourth system-provided node and a first ghost node, different than the first system-provided node.

Other objects, features, and advantages of the invention will become apparent upon consideration of the following detailed description and the accompanying drawings, in which like reference designations represent like features throughout the figures.

DETAILED DESCRIPTION OF THE INVENTION

Figure 1:
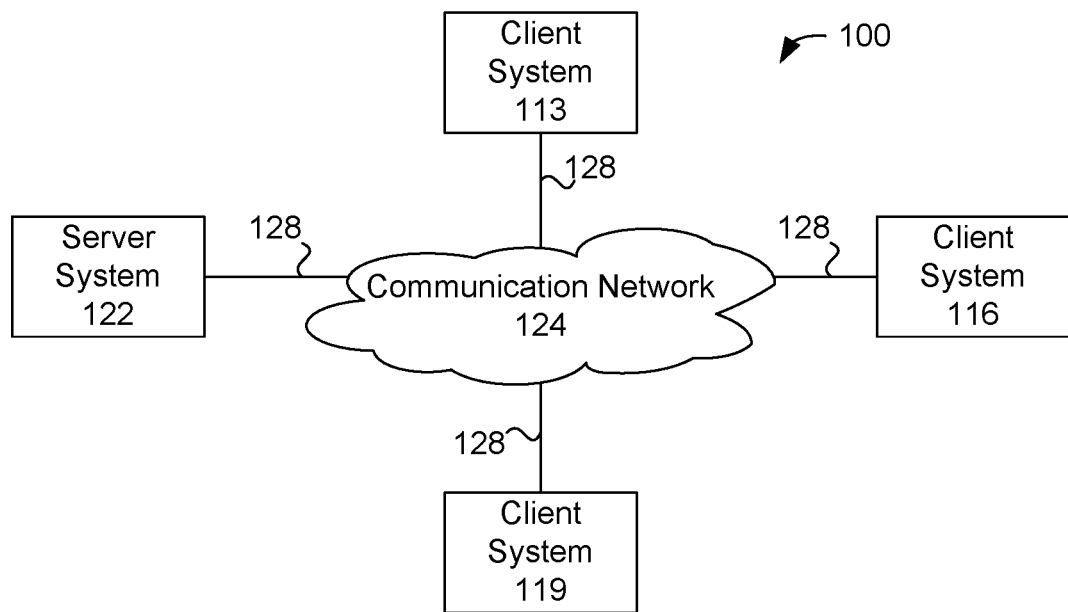
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome by Google Inc., WebKit and its variants, or others.

Figure 2:
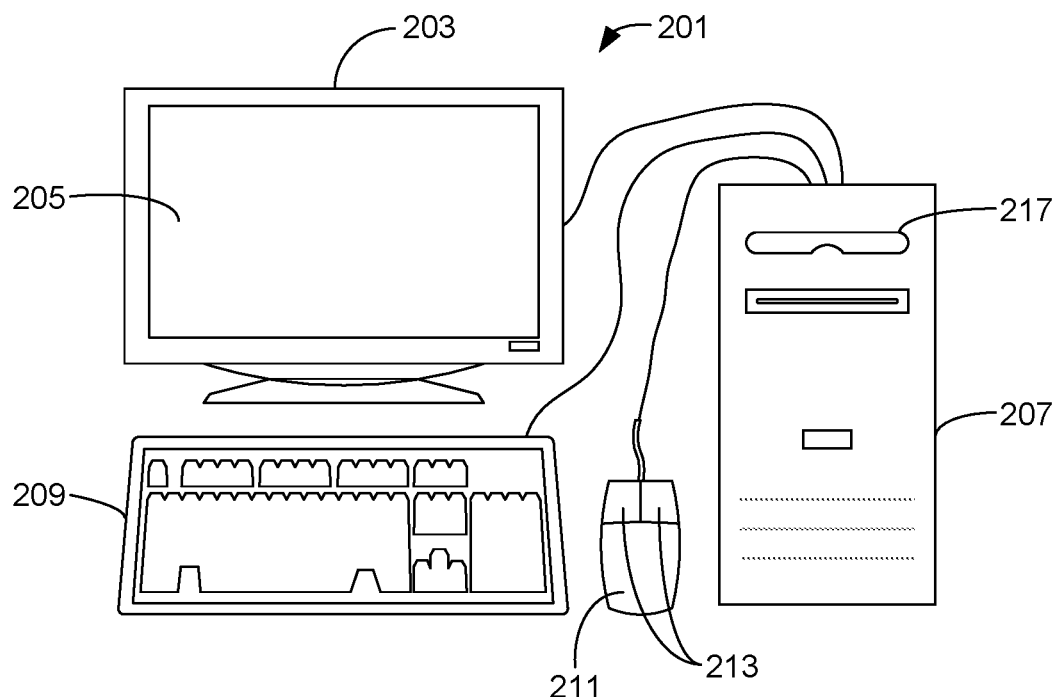
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPads, iPhones, PDAs, or Android phones.

Figure 3:
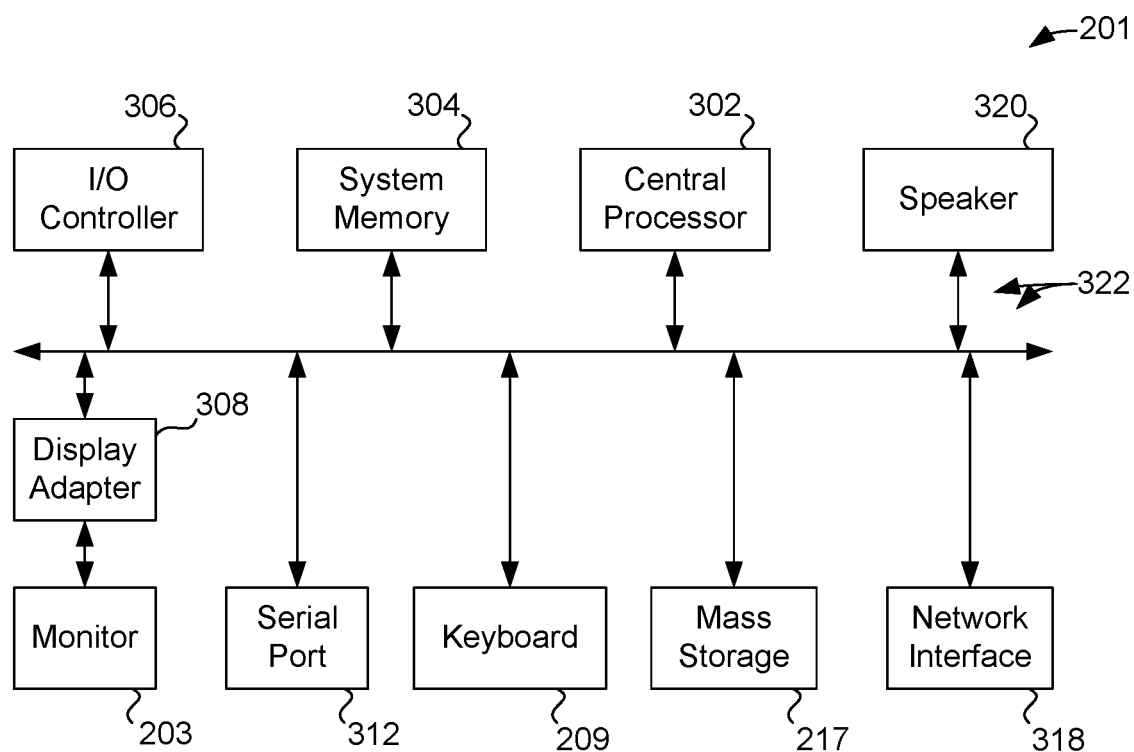
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, Microsoft Xbox 360 central processing unit (CPU), and ARM architecture based processors (e.g., Nvida Tegra2, Qualcomm Snapdragon, Apple A4).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS; Apple iOS4 or iOS5; Blackberry OS; Windows Phone 7.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1) CEO X controls Company Y, which in term owns a controlling stake in company Z; (2) X has transitive power over the CEO of company Z; and (3) CEO W controls company X, which in term owns a controlling stake in Company Y. We can determine that CEO of Company Y, CEO Z is very influenced by CEO W.

The system uses technology to collect this data, including pioneering innovative collection techniques (e.g., Internet, crawling, and filtering). Additionally, there can be a large team of people who "clean" this data. Given that the system is serving a very high-end clientele, the service needs to have very clean and precise data, which the human factor helps achieve.

Figure 4:
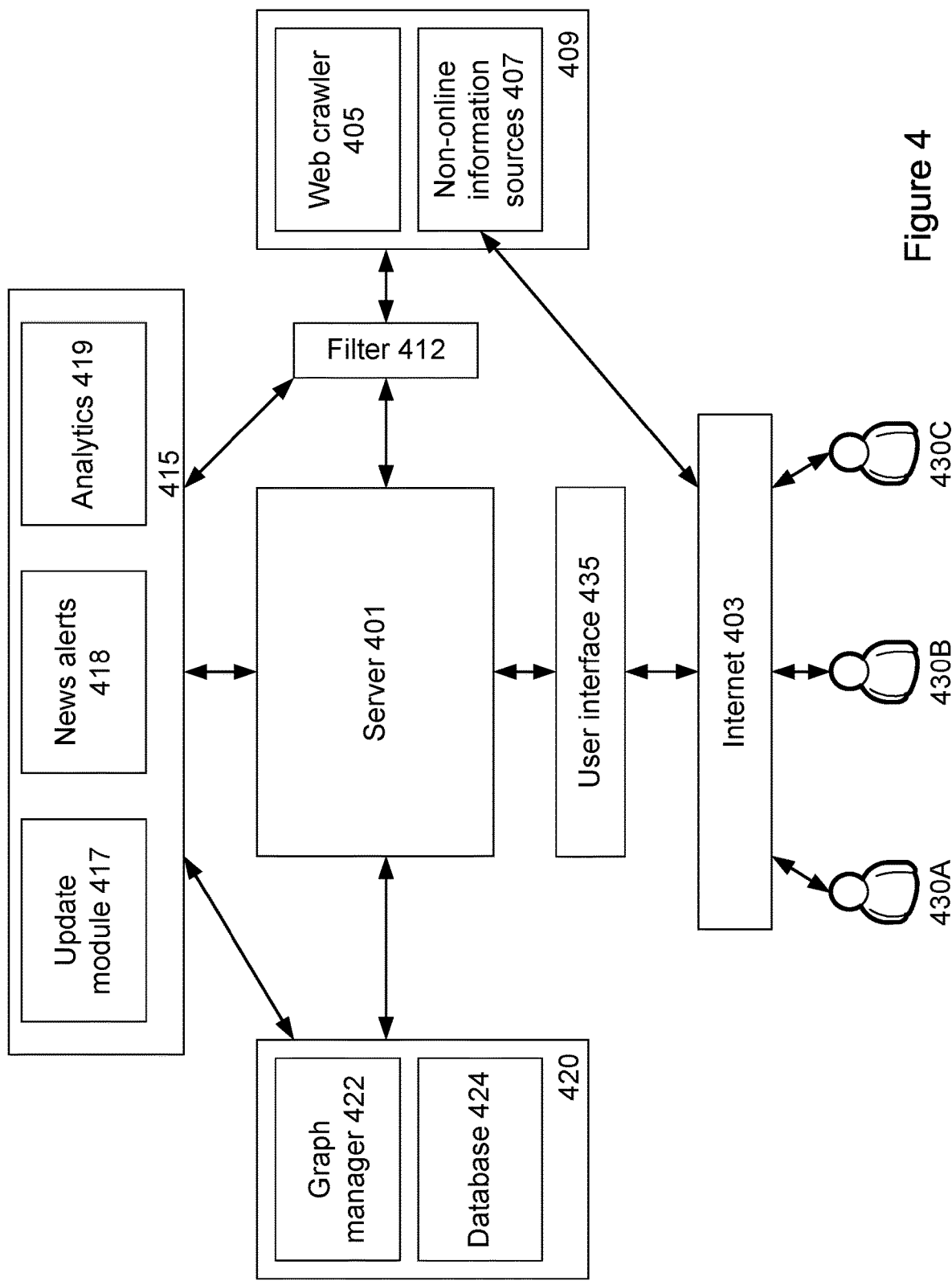
FIG. 4 shows a system diagram.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations. In a social graph of the system, entities of the social graph are connected by a variety of different edges representing different relationships between the entities. The information in the social graph is non-hierarchical (e.g., not organized as a tree). This means that, although one relationship may be more important than another similar relationship (e.g., a relationship of CEO to a company and another employee type to the company, a financial relationship where one is a greater economic value, or other types of relationships) the relationships are represented in the social graph similarly, without regard to ranking the weight of the relationship.

In an implementation, a server 401, having hardware such as described above, executes and stores software and data of the system. The server receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line source and sends the collected information to the server. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of Reed Elsevier Properties Inc.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person or organization. The person or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module updates the social graph of the system.

The news alerts module 418 determines and transmits alerts to users of the system. This module continually scans data entered into the system to determine whether the data matches a watch (or alert) of a user. A watch can be satisfied when news is about an entity selected by a user, a related entity to the entity selected by the user, or other criteria using an ontology of the system. In an implementation, the news reporting module is connected to a communications module that allows the news alert to be sent to a user's e-mail inbox.

The analytics module 419 performs analytics on the information of the system, such as calculating influence index values for each node and other metrics based on the social graph. The analytics modules uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via an Web browser at a client device. The client may be a mobile device such as a smartphone or tablet computer. Depending on what type of device the user 430A-430C is using, the user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n-1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system). In an implementation, ghost nodes representing other users are invisible to users of the system. This can be done, for example, through encrypting ghost nodes of the system, which prevents users from accessing information on selected nodes (e.g., ghost nodes).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

Figure 5:
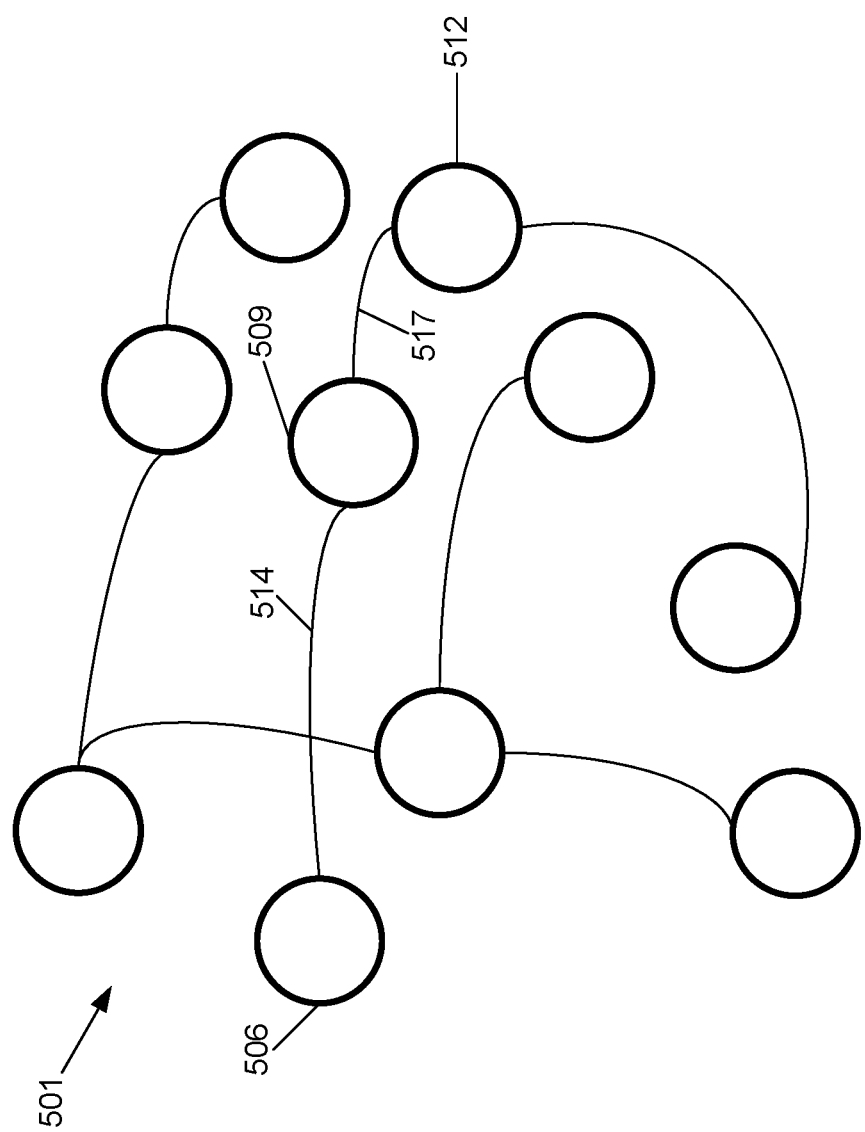
FIG. 5 shows a social graph with system-provided nodes connected by system-provided edges.

FIGS. 5-9 show a sample social graph of information for a system of the invention. FIG. 5 shows a sample master graph 501. This graph is maintained by graph manager 422 of the system. The nodes or circles (e.g., 506, 509, and 512) represent entities (people or organizations), and an edge or line (e.g., 514 and 517) between two nodes represent a connection between the two entities. In an implementation, the nodes can represent any entity (e.g., organization, people, organizations, creative works, events, products, awards, places, groups).

Nodes 506, 509, and 512 are system-provided nodes. Node 506 has a one-degree connection through edge 514 to node 509. Node 506 has a two-degree connection through edges 514 and 517 to node 512. Node 509 has one-degree connections to both nodes 506 and 512, through edges 514 and 517.

Figure 6:
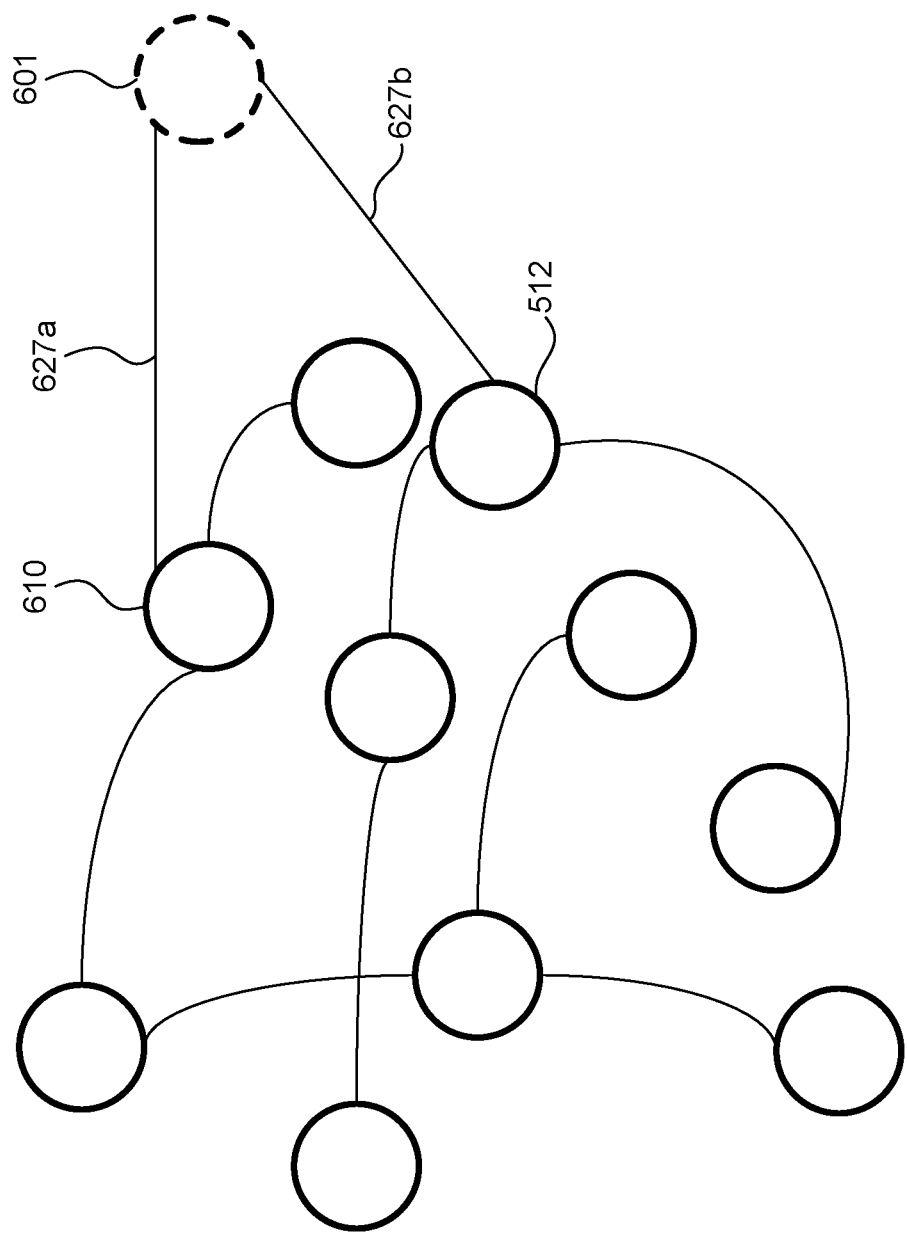
FIG. 6 shows the addition of a first user as a ghost node with ghost edges to the social graph.

FIG. 6 shows a first user being added as a ghost node 601 to graph 501. Node 601 is shown in broken lines. This first user 601 can be representative of a subscriber (e.g., ghost node) in the system, while the other nodes in solid lines are representative of a system-provided person or entity. The first user 601 adds information on connections they have in the system. For example, the first user in FIG. 6 is associated or affiliated with two persons 610 and 512 in the master graph, as represented by the two ghost edges 627a and 627b.

Figure 7:
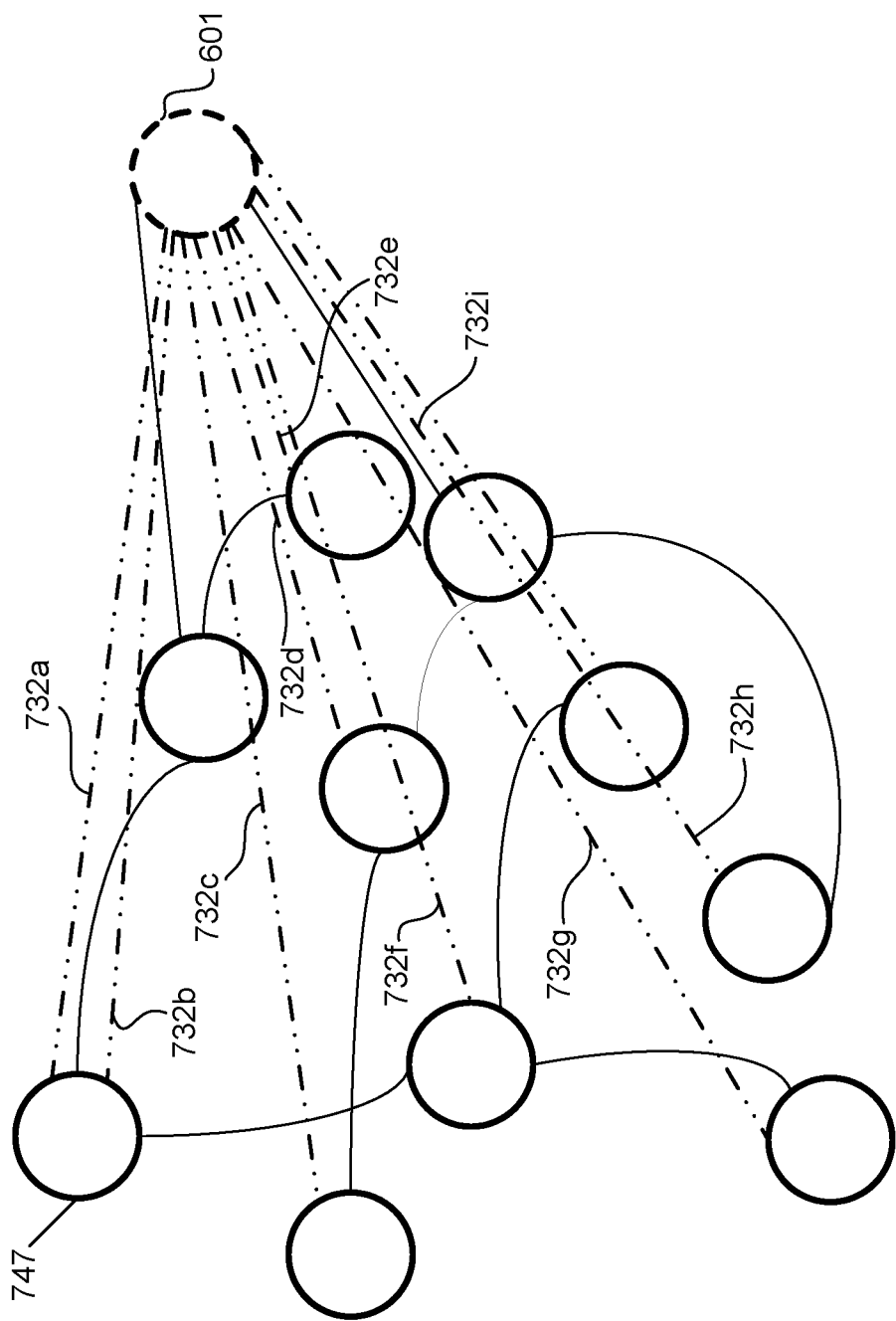
FIG. 7 shows connections the first user can make to system-provided nodes of the social graph.

FIG. 7 shows relationships ghost node 601 has with other nodes of graph 501. Node 601 has first-degree connections to nodes 610 and 512 (see FIG. 6). The relationships are represented by connections 732a-732i (not shown in FIG. 6) are of varying degrees of separation, greater than one. Node 601 has n degrees of separation with these nodes, where n is a number of edges (ghost edges and system-provided edges) that exist between the nodes to be traversed. For example, node 601 has a two-degree connection to a system-provided node 747, passing through one ghost edge and one system-provided edge.

Greater than one-degree connections are the connections that the first user does not have directly (e.g., first degree of separation or one step), but has through additional people or nodes. With the information in social graph from, the first user can trace how this connection or route is established.

Figure 8:
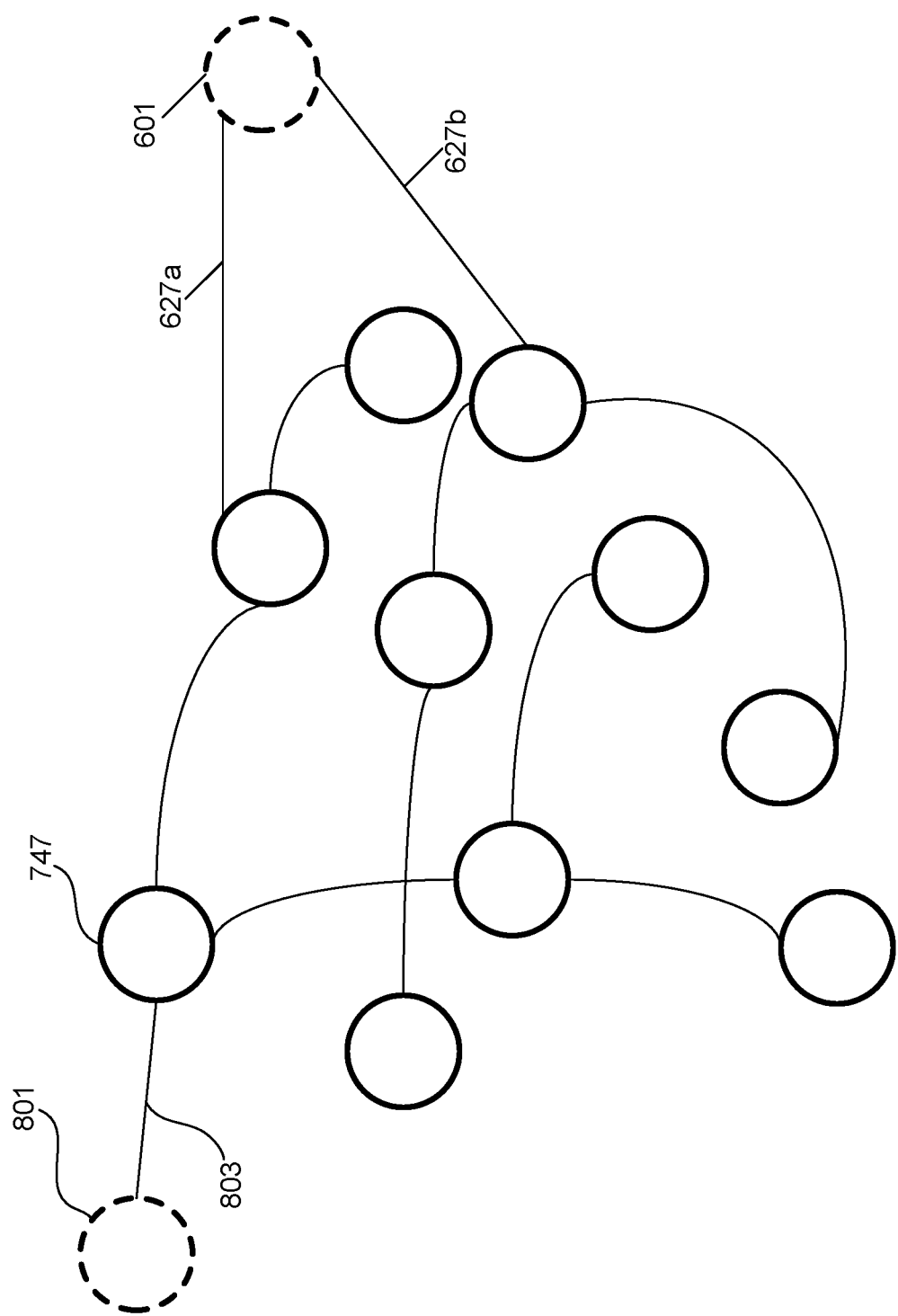
FIG. 8 shows the addition of a second user as another ghost node with a ghost edge to the social graph.

FIG. 8 shows a ghost node 801 for a second user 801 being added to graph 501. Node 801 is shown in broken lines. This second user has a single connection through a ghost edge 803 to node 747. The second user is able to see the connections in the curated system, but will not be able to traverse through a ghost edge or ghost node, or to see information on any other ghost nodes or ghost edges. In particular, node 601 and edge 627a and 627b will not be visible or accessible to the second user.

Figure 9:
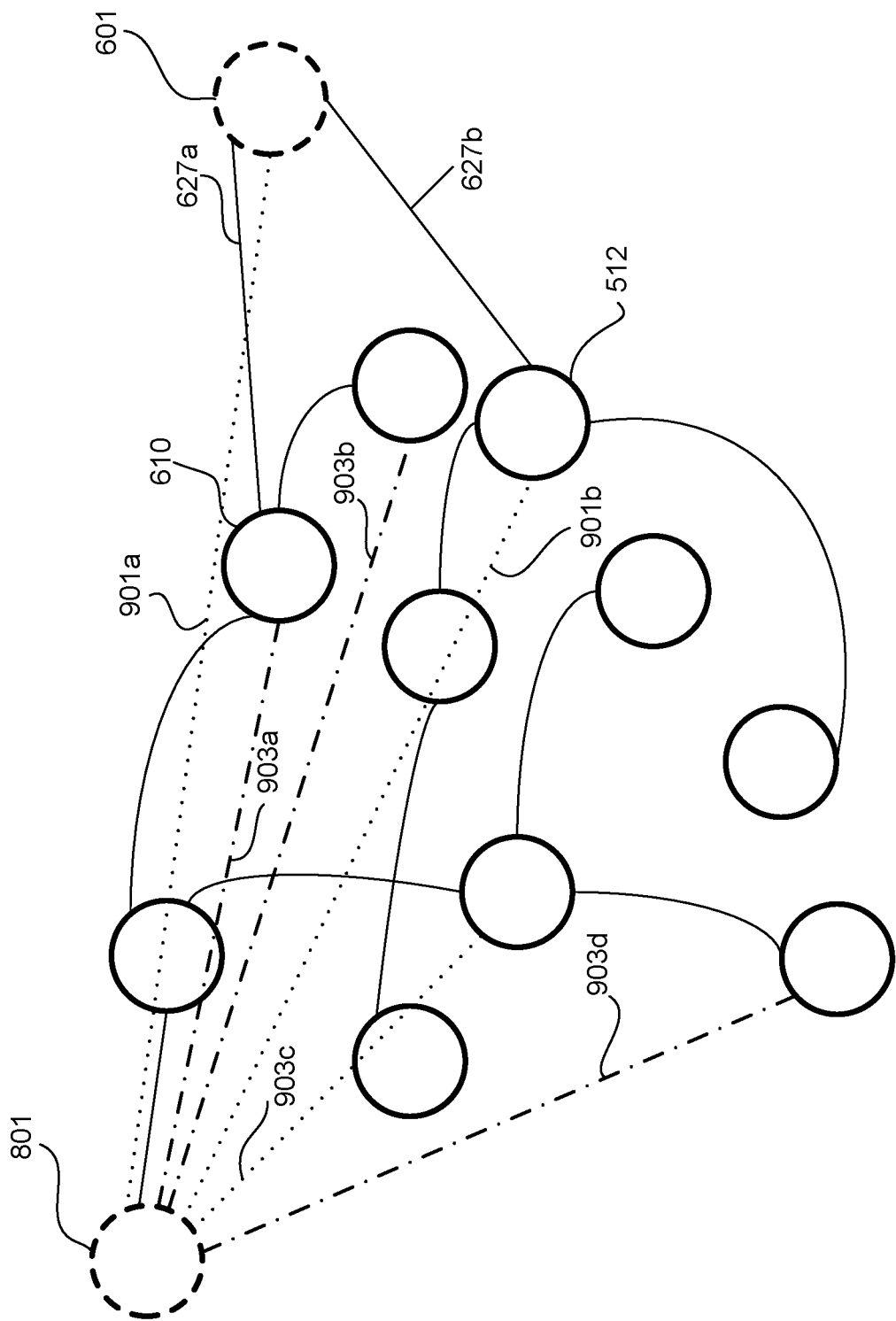
FIG. 9 shows connections the second user can make to system-provided nodes of the social nodes, and the first user's ghost node and edges are not available to the second user.

FIG. 9 shows a connection 901a between node 601 and node 801, as well as a connection 901b from node 801 to node 512. The second user 801 is also connected by edges 903a, 903b, 903c, and 903d to various nodes that are two or more degrees of separation from the second node 801. Connections 901a and 901b are shown using a dotted line. System provided nodes may be connected via ghost nodes and ghost edges. In this figure, nodes 610 and 512 are connected by ghost node 601.

However, in an implementation of a system of the invention, users of the system (e.g., represented by ghost node 801) will not be able to see connections between system-provided nodes (e.g., 610 and 512) that are due to ghost nodes (e.g., 601) and ghost edges (e.g., 627a and 627b) of other users.

Therefore, in the graph this figure, the second user (i.e., node 801) has no connection to system-provided node 610. To reach node 610, the two ghost edges to the first user 601 would need to be traversed, which an implementation of the system does not allow.

In other implementations, a ghost node (e.g., super ghost node) can make traversals through other ghost edges and ghost nodes to make a connection to other system-provided nodes. This can occur when two users share contacts and connections between each other. So, in this example, when first user 601 and second user 801 share connections (or part of the same entity or company), both gain additional connections (e.g., n-degree, n-step connections). For example, the second user gains a connection to node 610 through the route 901a to 627a.

In an implementation, the system can have a limit for a number of degrees (i.e., d) for displaying or considering connections. As discuss, as the number of degrees increases, the strength of the connection or relationship between two nodes diminishes. Also, processing power by the system increases as d increases since many more nodes and edges are to be considered. Therefore, the limit for the number of degrees, d, can be system defined or user defined (discussed above). For example, d can be 2, 3, 4, 5, 6, 7, 8, 9, or another integer. Then, when requested to show the list of connected nodes, the report listing will show nodes restricted to within the degrees of separation as specified by the d value.

In an implementation, the graph database of the system has nodes (representing entities) and edges (representing relationships). The entities and relationships can have any number of properties. Each property for a particular entity or relationship, also has a value. Additionally the edges are directional, so that each edge implies an incoming and an outgoing node. The relationship one node has over another is different can have different meaning, but the one relationship is represented as one explicit fact. Nodes (or vertices) and edges also have weights (or rankings) that is determined by the type or category.

In an implementation, every piece of information is attributed with a "type." The type system is our ontology as information is broken down into a few major categories that organize different types of data. Entity Types classify each entity, or node in the graph at the top level. In an implementation, entity types include: People, Organizations, Creative Works, Events, Products, Awards, Places, and Transactions. Each Entity in the system can be categorized at very granular levels, and have multiple classifications, however, each entity must have exactly one top level type. Further information on these entity types follow:

(1) People. These are the natural persons in the system. Many of the other entities relate to one or more people in the system.

(2) Organization. For example, these are companies, nonprofits, associations, fraternities, or others.

(3) Events. The system can track event such as business transactions, conferences, parties, award ceremonies, or others. These events can have influential or important persons in attendance.

(4) Creative Works. Creative works are films, TV shows, paintings, books, or others. These entities are important because they create additional connections between entities.

(5) Awards. Awards can be creative work awards, ranked lists, hall of fame memberships, Honorary Degrees, or others. Awards can be given to people, organizations, and creative works. These are usually given (or granted) by an organization.

(6) Products. Products are produced by companies. Products can be dealt with both on an abstract level (where one entity represents the product), or on a per instance level. Stocks issued by a company, both public and private types of stock, are dealt with as products.

(7) Places. Places are a special type of entity in that these entities must be defined in geo-spatial terms. Places can be both administrative regions (e.g., cities, states, countries) as well as points or physical places (e.g., restaurants, museums, offices)

(8) Transactions. Transactions are ownership events that involve two or more companies, and any number of people.

In an implementation, an organization is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. For example, some organization can have many members or people. Using the example given previously, if there is a person C who is an entry-level associate at company A, the system does not need to create a person node to represent them. Instead, person C can be associated with the organization without a separate person node. This simplifies and reduces the information the system needs to store. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, a 0-1 Score of a particular entity's influence over another is calculated on the fly with our weighted path algorithm, as discussed in further detail below. This score may be the result of a function based on:

(1) Predicate (Type of Relationship); (2) Time (e.g., Recency, Length of time); (3) Amount of Incoming links of the same predicate, or (4) An array of Attribute value pairs are based on the system's ontology and can modify the weight-in/weight-out of the edge. This includes all of the paths throughout the graph that link those two entities together.

In another implementation, the ontology of the system is represented by two separate Ontologies which are referenced throughout the system's data set in a number of concepts. These type systems are, for example, Concepts Graph, and Type System. The Type System is represented by six separate graphs which have different applications and different significance: Entity Classifications, Entity Attributes, Relationship Types (e.g., Edge Labels), and Relationship Attributes, Entity Attribute Values, Relationship Attribute Values.

Entities are categorized in the "Entity Classifications" partition of the type system. Each value in the entity classification can be linked to any entity in the graph via the "Type Of" Edge. Each vertex in the graph will be linked to at least one classification.

In an implementation, the system links interests as concepts in the concepts ontology. This allows us to connect people having similar interests while not having the exact same interest. For example, we could connect the node for "Biking" to the node of "Running" with a "Related Interest" edge.

In an implementation, the direction of a particular relationship type or edge label is defined in the "Relationship Types" system. A directed edge has a name and an inverse name, and different values for the default in/out weights. A bi directional edge has a NULL inverse name and has the same value for weight-in/weight-out. Some relationships, such as a friendship, has no direction, since there are no inverses. A direction is useful for representing other relationships, such as a father or employee, since directed relationships have are inverses. A fixed weight is used to calculate all relationships of a specific type. A fixed weight is associated with the inverse relationship (if is directed).

In an implementation, influence is determined in two ways by two master algorithms. These algorithms determine the influence that two entities in the graph have over each other and one entity's influence in the world. This includes:

1. A person's influence in the world (their centrality in the graph).

2. A person's influence over a particular person.

3. A person's influence in a particular sector.

4. A person's influence over other types of entities (e.g., person, organization, creative work, field of study).

5. A person's influence over a concept (e.g., the most influential people in Mathematics).

In an implementation, a centrality algorithm is used. The centrality algorithm determines a person's overall influence in the world, which is a function of their influence over the people they know, and how powerful those people are. The more powerful people (quantity and quality) you know (the better), the more powerful you are. The more powerful those people are, the more powerful you are. The more powerful people the user knows, the more powerful those people are, and the closer the user knows those people, the more powerful you are.

In yet another implementation, the centrality algorithm uses sign posts. This is a sort of bias on the centrality algorithm to operate with the assumption that this entity has a higher or lower weight then it would usually have if the algorithm were to be run with no bias. When the weight of one entity starts off with a bias, it effects the weights of all other entities and ripples through the entire graph. In order to ground the weighting mechanism of the system, and to get started in calculating influence, the system uses some Educated guesses (e.g., initial values) for some people. Having that weight allows us to calculate the weights of the entities surrounding them in the graph. Sign posts are not only used to bias the overall influence on one person in the master graph, they can also be used to bias their influence in a sector (or concept). In an implementation, sign posts are used in a concept by attaching edges from relevant nodes to a concept node. A bias can be applied to a node connected to the concept. Once the bias is applied, the effects of the bias can propagate through to other nodes connected to the concept (e.g., adding weights to edges connected to the concept).

For example, providing President Barack Obama an influence of 1.0. It is fair to say that anyone who has influence over President Obama, has influence in the world. Since we know this weight, we can start to calculate the influence of the people that surround him and others by how closely they are associated with him. See further discussion of signposts elsewhere in the application.

The system calculates the distribution of energy (or weight) in the graph but instead of having each node start with the same value, the system staggers it by hard coding influence metrics for a particular set of entities. This allows the function to feed off of itself In an implementation, weighted path algorithms are used to determine influence. For example, person-to-person influence can be determined according to: a particular relationship type (a predefined constant); the amount of direct and indirect relationships between two nodes; the influence of those incoming and outgoing links and time (duration and recency). In a simple form of the weighted path algorithm, two people who are on the subcommittees of the board for two public companies boards (e.g., small groups that are important and meet often) for the last five years (such that they have many meetings and discussions over time) have a stronger relationship that two people that were on a large (50 person) nonprofit board 10 years ago.

In yet another implementation, a person's influence over a non person entity can be determined. This non-person entity can vary from a company to a film. Influence is calculated per instance based on, for example, relationship type (e.g., Board Member), time, size of company, or others with influence. Additionally, there is the concept of influence over others with influence over the organization).

In an implementation to gather overall influence of a person, the summation (a simplified version of the function used as an example) of the relationship instances or paths between two nodes is calculated. Meaning if someone is the founder, and the CEO, those two different relationships have different weights independently. The summation of these two relationships, or edges, gives us the overall influence that one entity has over another.

In an implementation, an entity can have pass through (or indirect) influence to another entity. An example is that a person who has influence over Obama means that person is influential in the world. Another example is a private equity executive's influence over one of the firm's portfolio companies. In a specific example, a person A who the CEO of a well-known private equity firm has a certain influence over the firm. Since the equity firm owns a portion of a company B, person A has influence over company B and the CEO of company B. This means that person A has some quantifiable influence over company B. This is transitive (or pass through) influence.

In another example, consider the following relationships: Dave is Chris' friend and Dave is Chris' boss. Dave has a certain amount of influence over Chris, and Chris has a certain amount of influence over Dave (albeit less). In the first relationship, the relationship has no direction, that is "friend" means the same thing if you where to swap out Dave and Chris in that sentence. In the second relationship, the relationship implies a particular direction. The same predicate (or relationship type) is not the same when the entities are swapped. The system uses the direction of a relationship to derive influence metrics. Other metrics includes size of the group, length, seriousness (board subcommittee for instance), recency, and duration. This can be extended to companies. A CEO has a certain amount of influence over a company, and most certainly the company has influence over him.

In an implementation, the weighted path algorithm calculates the weighted paths between two nodes. Those two nodes could be the combination of any two types of node that exists in the ontology. For example, these can be:

(1) [Person]-to-[Person],
(2) [Person]-to-[Organization],
(3) [Person]-to-[Industry], or
(4) [Person]-to-[Concept].

In an implementation, one user's node is a ghost to every other node in the system. Thus, a piece of data added by a user will have no relevance to another user. However, for groups of users, say a small venture capital firm, the system allows a group of people to enter their contacts that are shared. This means that instead of just one node being the center of the universe for a user, the group of people in the firm are at the center. The value of the product increases tremendously by this sharing because it allows the users to plug-in to the database with a larger core. By interacting with friends and colleagues the connection possibilities increase dramatically. The application has generated a set of distinct paths for two users, and by sharing contacts, now each user can see, and interact with each other's path to power.

Figure 10:
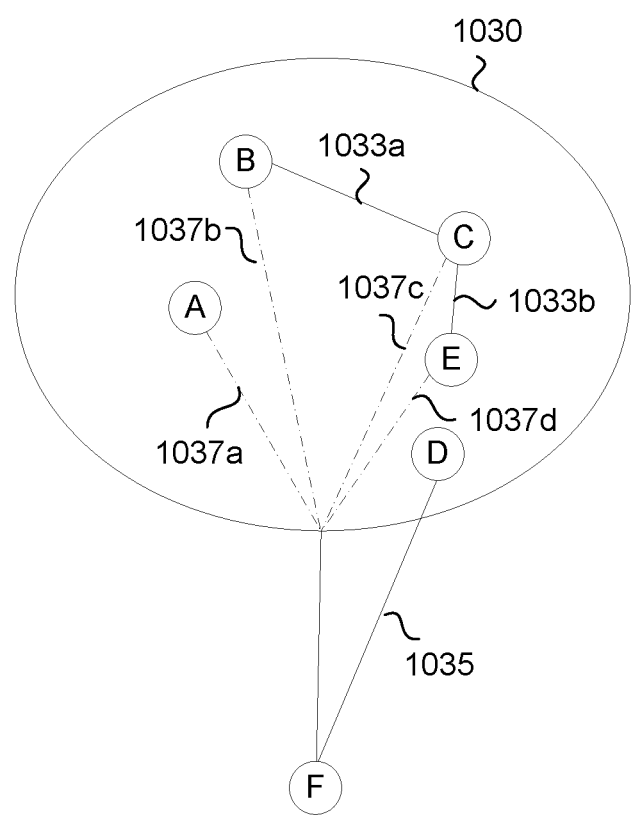
FIG. 10 shows sharing links in an organization.

FIG. 10 shows sharing links in a sample organization (or group). The organization 1030 has members A, B, C, D, and E. In the organization 1030, member C is connected to member B by link 1033*a* and member E by link 1033*b*. Although part of the same organization 1030, member A and D and not connected to the other members of the organization (e.g., B, C, E). However, member D is connected to an entity F by link 1035. This entity F is not a member of the organization 1030. Thus, members A, B, C, and E gain a connection to F by links 1037*a*, 1037*b*, 1037*c*, and 1037*d*. These can be first or second degree connections. For example, link 1037*a* is a first connection from A to F or a second degree connection from A to the organization 1030 to F.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node.

In another implementation, a system-provided node is a node created by a person other than the person represented by the node. For example, if Person A is a person represented by a system-provided node, a person other than Person A creates the node. In another example, where an Organization A is represented by a system-provided node, a person who is not a member of Organization A creates the node. In an implementation, the user is denied access to editing a system-provided node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

This application incorporates by reference U.S. patent application Ser. Nos. 13/224,110, 13/224,117, 13/224,119, 13/224,138, and 13/224,149, all filed Sep. 1, 2011; 13/225,377 and 13/225,380, both filed Sep. 2, 2011; U.S. patent application Ser. Nos. 13/236,602, 13/236,606, and 13/236,617, all filed Sep. 19, 2011; U.S. patent application Ser. Nos. 13/532,653, 13/532,663, and 13/532,672, all filed Jun. 25, 2012; and U.S. patent application Ser. Nos. 13/738,233, 13/738,242, 13/738,248, 13/738,261, 13/738,264, and 13/738,273, all filed Jan. 10, 2013.

Figure 11:
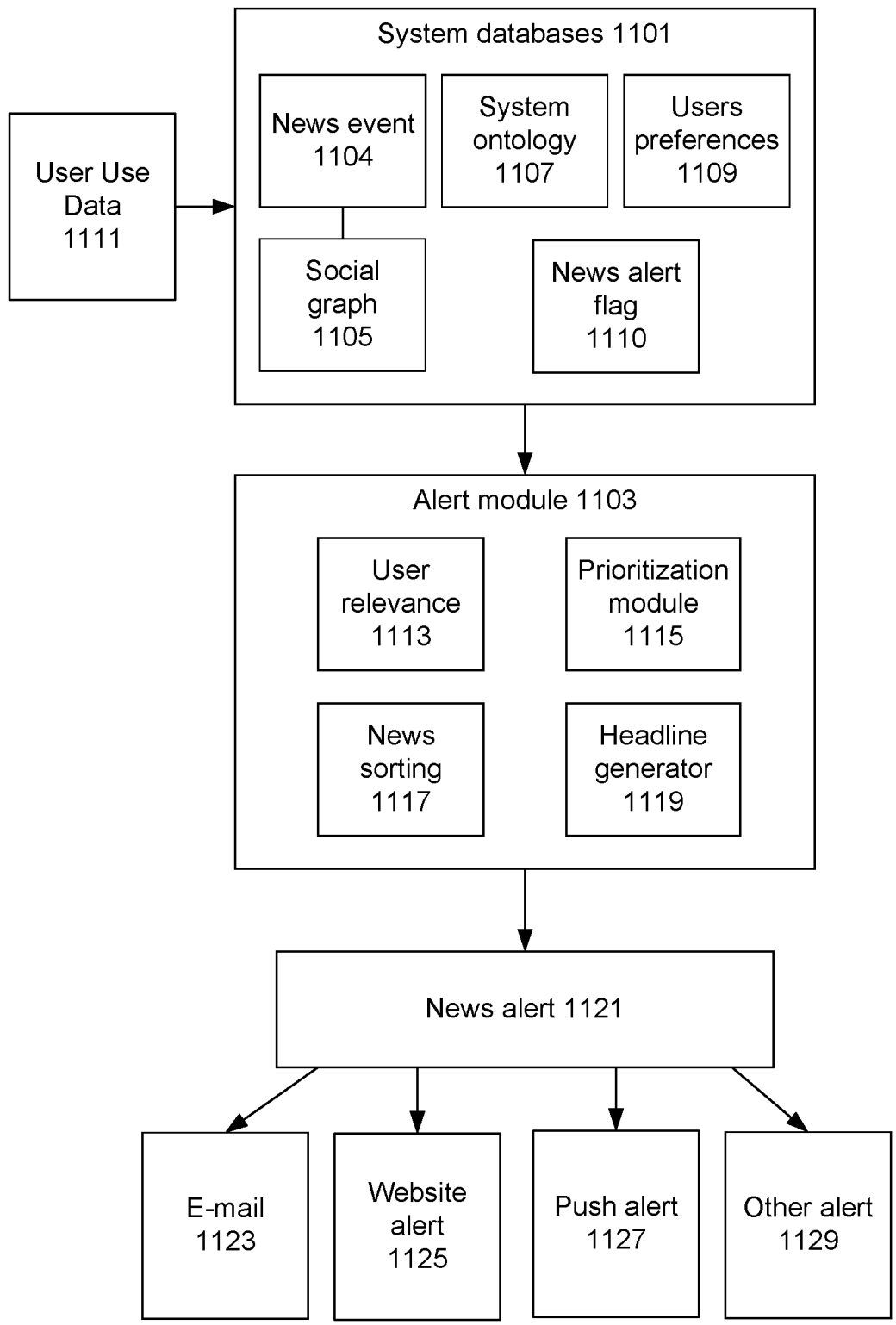
FIG. 11 shows a system diagram of a news alert system.

FIG. 11 shows a system diagram of a news alert system. A system data module 1101 contains various information of the system. This information is stored on one or more databases of the system. A news source with news events 1104 is connected to social graph 1105. News events can be generated from any news source supported by the system, such as news articles from on-line sources (e.g., LexisNexis, Westlaw, The Wall Street Journal, New York Times, Federal filings), printed sources (e.g., listing of donors for a charity event, Federal filings), and many others. In an implementation, the system performs disambiguation of news articles to determine a news event. For example, if there is a large piece of news, oftentimes more than one news source or other source will cover the news event. The system performs disambiguation, to identify that these sources are reporting the same news event, so that the information quality is maintained. The system processes information from the news events to create, update, or change connections in the social graph 1105.

An overall flow of a news alerts system is to: (1) Determine whether a person mentioned in a news article is the person which is the subject of a system-provided node. Many people have the same or similar name or there are many entities have the same or similar name. The system uses a technique to make a determination that the person is the subject of a system-provided node. (2) Determine whether entities are related. This is similar to (1), and the system makes a determination any entities related to the person which is the subject of a system-provided node. (3) Order the news alerts. A person can have a number of people they want news alerts for, and the system orders these based on various techniques described further below.

System data also includes information on an ontology 1107 of the system. The system's ontology defines how entities are represented in the system (e.g., the social graph of the system), as well as how these entities are related to each other. As an example, a donations ontology can define how a person entity makes a financial donation to an organization entity. Information associated with the donation can also be specified by the system. In the donation example, associated information includes an amount of the donation, date of donation, where the donation was made, or other information.

In an implementation, the system determines related entities based on the ontology. A second entity becomes a related entity to a first entity when the kind of relationship they have is strong enough so that what happens to the second entity also applies to the first entity. Using the ontology, the system can identify entities listed in news events, but also related entities to the identified entities. These related entities are then tagged as to be included in news alerts with their corresponding entity. Further information regarding an ontology that can be used with the system can be found in U.S. patent application Ser. Nos. 13/236,602, 13/236,606, and 13/236,617, all filed Sep. 19, 2011.

For example, if entities are close family members, these are related entities. So, if person A is the spouse of person B and person A is included in a news release about a charity event (and person B is not included in the news release), a user that has included person B in their user preferences would have the news charity event in their news alert. The news alert can also list what caused the charity event to be listed (e.g., wife of person B attended charity event).

In another example, a person entity is a related entity for a company entity that they serve on the board of directors of (or have a similar close relationship such as being chief executive officer). So, if person C is on the board of directors for organization A and organization A is included in a news event, a user that has included person C in their user preferences would have the news event in their news alert.

The system data 1101 also includes user preferences 1109. This includes information associated with each user of the system. The user preferences can include user selected tracked persons, organizations, or other entities in the system. The user preferences 1109 can also include user use data 1111. Some example types of user use data includes a user's inbox, outbox, instant messaging, phone calls, clicks in the system, and many other types of user use data. This can include a user priority ranking data for news alerts, as discussed in greater detail elsewhere in this application. The system includes a news alert flag information 1110. At a given time or news event, not every user will need to have a news alert generated. This can be because the user is not interested in the entities included in the news event or other reasons as discussed elsewhere. If a news alert is needed for a user, the system will set the news alert flag corresponding to the user, indicating that a news alert should be generated for the user.

The system data 1101 is connected to alert module 1103. The alert module processes information from the system data to determine which, if any, news alerts should be sent to users of the system. While some news events will cause the alert module to generate alerts for some users, some users will not receive a news alert for the news events. This can be due to settings, information, and selections stored in the system (e.g., information stored in system data module 1101).

A user relevance module 1113 determines whether a news event should be sent to a user. This includes accessing user preferences 1109 to determine whether a specific news event should be included in a news alert. This can be done in conjunction with the system ontology 1107 to include related entities. A prioritization module 1115 uses the user use data 1111 to determine a user priority ranking for a user. The system determines whether data is relevant to a user before it determines the priority of the news. For example, after the user relevance module 1113 has determined a news event is relevant and should be included with the news alert for a user, a news sorting module 1117 determines how to arrange and sort news events in the news alert.

The prioritization module 1115 includes features usable for a variety of purposes in the system. This includes using the module information to organize lists, groupings, tables of data for a user in the system. A feature of the system is that this priority listing provides results and information of greater relevance or importance to each specific user, with greater emphasis. This can mean that the system orders results according to the highest importance according to the user priority ranking higher in a list or by using bold text or other method to emphasis an item as more important than another.

A headline generator module 1119 executes as part of the alert module. As described in greater detail elsewhere, the headline generator module is used to provide a concise summary of a news event in plain English. Although some sources of information (e.g., news paper articles, on-line news sources, or other) will generally provide a news headline, some sources may not. This occurs when information within a news item is used to generate a news alert. These can include government filings, press releases, news articles, or other sources of information where a headline may or may not be included, but do not reflect the information the news alert is for. For example, a stock sale by a private party is included in a government filing, but there is no headline or summary of the information that can be included in the news alert. The system will determine and format this information for use in a news alert.

In an implementation, the system can use a variety of factors that manipulate user, news, and other information to determine an order for organizing data (e.g., news events, lists, updates, and other data) for a specific user. These can be categorized into two different groups of factors. A first group contains user independent factors. These are factors that would apply to each user of the system, independent of attributes associated with a specific user. For example, these factors apply to user 1 as heavily as they apply to user 2. A second group contains user dependent factors. These are factors that use specific attributes of a user stored by the system. These can be user provided details (e.g., their name, connections to organizations, connections to persons, or other attributes) or system determined details (e.g., how many times a user clicks on a link of the system, how many times a user e-mails a person, or other attributes). For example, some of these factors will weigh heavier or have no weight for two different users. To sort items in the system, the system can determine a score (e.g., a best news score) based on user dependent and user independent factors. Items in the system that have a higher score will be prioritized in listings shown to a user. When determining a score, one or a combination of these factors from the nonexhausative list of factors below can be used. These factors are discussed in greater detail in tables 1 and 2 below.

TABLE 1

User Independent Factors

| Factor | Description |
|---|---|
| Entity Rank | The system prioritizes articles about people and companies that are relatively more influential. For example, a news article about a large public company would take precedence over a similar news article about a small private company. |
| Entity Relevance | The system uses the relevance of a person or company to a given article. |
| Topic Tags | The system prioritizes articles tagged with certain topics (e.g., mergers & acquisitions). |
| Industry Tags | The system prioritizes articles tagged with companies in certain industries (e.g., legal, financial, or other industry). |
| Date/Recency | The system can prioritize more recent articles over older ones. |
| News Source | The system prioritizes articles from certain sources over other sources (e.g., The New York Times has higher priority than US Weekly). The system can also prioritize news articles over press releases. |
| Number of Similar Articles in a Day/Week | If a big story breaks, many articles will be written about it. The system identifies similar articles and prioritizes news items that have been covered by multiple sources or on multiple occasions by the same source. |

TABLE 2

User Dependent Factors

| Factor | Description |
|---|---|
| User's Location | The system uses the user's location to prioritize local news. For example, if the user is in Chicago as determined by the system (e.g., by GPS, IP address, user selection, or other), the system prioritizes articles about people and companies that are located in the Chicago area. |
| User's Profile Information | The system uses the user's profile data to prioritize news. For example, if the user went to Yale University (as indicated in their private profile), the system increases the priority of news about people who went to the same school. |
| User's Previously Clicked Profiles | The system prioritizes articles about entities of the system (e.g., people, organizations, concepts, and other entities) that the user selected in the system previously. Additionally, the system prioritizes articles about people and companies similar to entities whose profiles the user has clicked on in the past. |
| User's Previously Clicked Articles | The system prioritizes articles that are similar to articles the user has previously clicked on in the past. |
| User's Relationships (Direct News) | The system prioritizes articles that mention people the user has tagged as relationships. |
| User's Relationships (Related News) | The system prioritizes articles that mention entities (e.g., organizations, persons, or other) to which the user's relationships are connected. |
| User's System Entity Relationship Likelihood | The system prioritizes articles that mention people the user's corresponding system entity has system-inferred relationships with. |
| User Inferred Relationship Strength | The system prioritizes articles that mention people with whom the user frequently communicates (e.g., the system determines the strength of the relationship using e-mail communications and then uses that inferred strength to rank news articles). |
| User Edited Relationship Strength | If the user has manually upgraded or downgraded the strength of a relationship to an entity in the database, the system uses that edited strength to prioritize news articles that mention the system entity. |

TABLE 2-continued

User Dependent Factors

| Factor | Description |
| --- | --- |
| User's Industry Segment | The system prioritizes articles tagged with companies in the user's industry segment. If a user works at a hedge fund, the system might prioritize news about other hedge funds. The system might also prioritize articles featuring certain topic tags for certain industry segments. For example, investment bankers and private equity professionals may be particularly interested in articles about mergers & acquisitions. |

In an implementation, the system determines priority based on user independent factors before user dependent factors. This offers potential processing savings, since most news items (or events) may apply to more than one user of the system. This way, sorting news items using user independent factors first prevents duplication of sorting by user independent factors more than once for the first and second user. In another implementation, the system determines priority based on user dependent factors before user independent factors.

Some systems show results in a list by some criteria established by the system (e.g., importance of the person, number of news results of the person, alphabetical order, or other criteria). However, this becomes inconvenient for a user who then has to go through their results to find what they want because these results are not personalized to their own use patterns. For example, a very famous person would often be the highest importance in other systems, since they have the highest importance and are likely included in many news articles.

But these famous persons may not be the persons a user finds most important. For example, a user may choose to nurture their relationship with another person they are connected to that is not as popularly cited in the news, since this is a person they are regularly in contact with. The system can adjust to this, by display news according to the user's preference. The user's preference can be stored as a user priority ranking that can be manually created by the user or derived from the user's use data. Using the user's use data to derive the user priority ranking is discussed in greater detail elsewhere in this application.

For example, if a user is connected to entities 1 and 2. Entity 1 is more popular than entity 2, as determined by the number of edges in a social graph of the system (e.g., entity 1 has more edges connected or entity 1 has more edges with higher weight connected according to the edge or the entity connected by the edge). In this case, the system determines that news from entity 2 should be prioritized over news items on entity 1.

The alert module 1103 generates news alert 1121. This news alert can be transmitted to the user in a variety of ways. Some methods include an e-mail 1123, an alert on the system website 1125, a push alert 1127, or other types of alerts 1129. The push alert 1127 includes a message transmitted to the user though a push message interface, such as a push message sent to a smart phone of the user.

For example, a listing of news events can appear in a list sorted by entity on a Web page. The alerts can include one or more piece of information in the alert. The system can be configured by the user to transmit alerts by number of news items determined to be relevant (e.g., every one news item, every five news items, every ten news items, or other number), whenever a news item includes a specific entity, or a given interval or time (e.g., every 5, 10, 15, 30 minutes, every hour, every day, every week, or other time interval).

Figure 12:
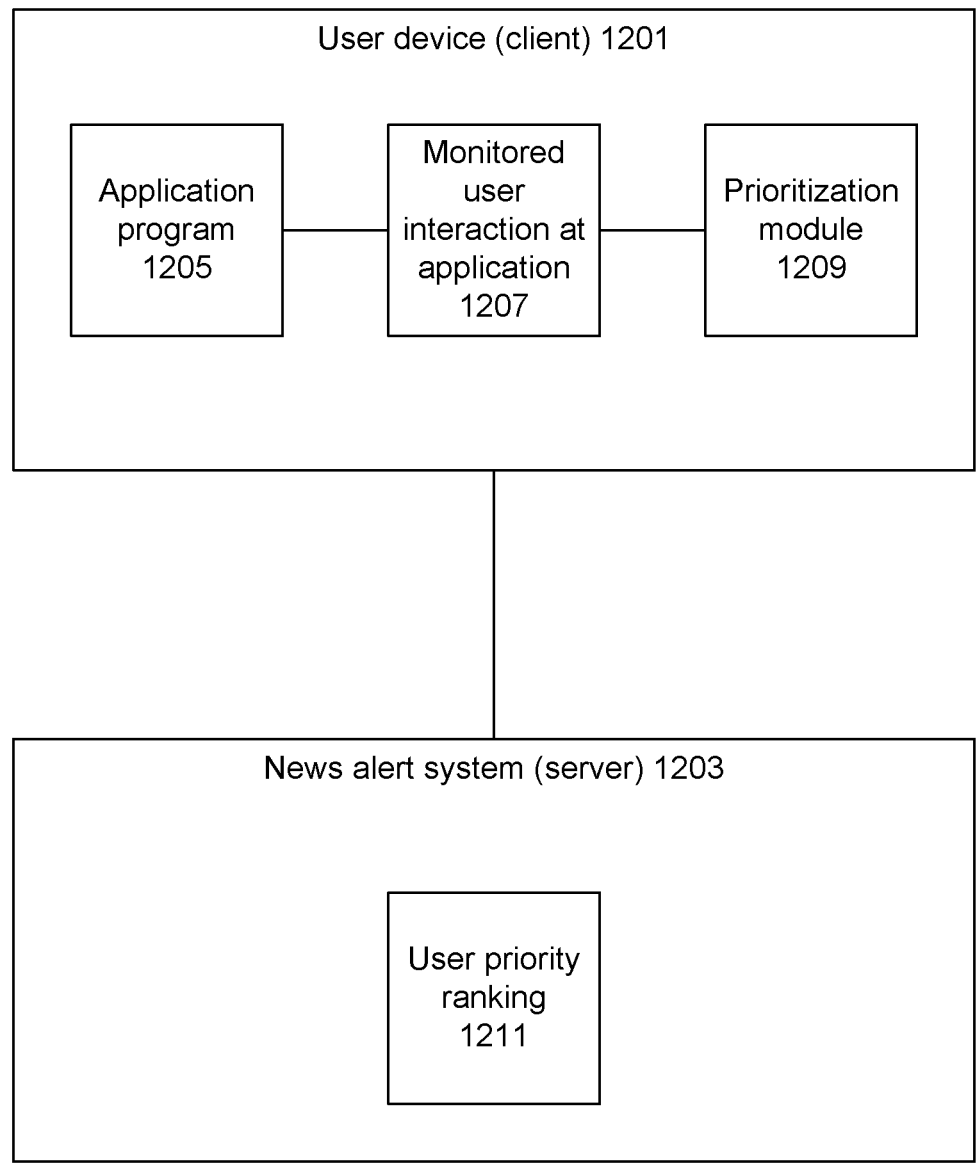
FIG. 12 shows a prioritization module for a news alert system executing on a client.

FIG. 12 shows a prioritization module for a news alert system executing on a client. A user device 1201 is connected to a news alert server 1203 of the system. The user device can be a variety of computing devices, such as a personal computer, tablet computer, laptop, smart phone, or other device. On the user device, application program 1205 executes. The system can monitor and collect user interactions with the application program 1207. The collecting user interactions occurs at a module executing at the user device. This can be installed as a plug-in with the application program or as another application program (separate from the monitored application program) executing separately from the application program.

The kind of user interaction collected by the system is dependent on the application program being monitored. Some applications the system can monitor include e-mail (whether company server based, cloud based, personal server based), instant messenger (e.g., commercial products, internally developed messengers, proprietary messengers), telephone calls, faxes, browser, or other systems that includes a recipient of a message or communication.

For example, for an e-mail client, the system collects information on e-mails being sent (or replied to), received, read, or a combination. In an implementation, the system collects information on sent e-mails by the user. This allows the system to determine what is relevant to a user with a higher degree of certainty than checking received or read e-mail alone. This is because if the user sends (or replies to) an e-mail, this indicates that the user has an active relationship with the recipient. This increases the likelihood that this is the kind of relationship the user will want to use the system to maintain and nurture the relationship they have with that recipient. On the other hand, received e-mail can include spam, mailing lists, or batch e-mails from senders that the user may not have consistent contact with. In another implementation, the system considers more than one type of user interaction with the e-mail application, on a weighted scale. For example, sent e-mails have a higher weight than read e-mails. This is because, since the user had to initiate the e-mail (whether a newly drafted e-mail or a reply e-mail), the system knows that the user will likely find information on the recipient of this e-mail more important.

In an implementation, the system includes a plug-in for a desktop e-mail client (e.g., Microsoft Outlook, IBM Lotus Notes, Mozilla's Thunderbird, or Apple Mail, or a combination of these at the same time). The system can automatically search for previous e-mails, and use this information to determine a user priority ranking. The previous e-mails can be limited by date (e.g., one week, two weeks, one month, two months, one year, or other period of time). This limits the amount of e-mail analyzed by the system to determine the user priority ranking, since old e-mails can be with people the user is no longer in contact with (e.g., they have become competitors, changed companies, or other circumstance). In another implementation, the system can include a user's e-mails with an entity tracked by the system. The system can include references to these e-mails when a profile page of the entity is viewed by the user.

More specifically, a plug-in for an e-mail client or a standalone monitoring application program monitors a user's e-mail. The plug-in (or monitoring application program, which is separate from the e-mail client) monitors an outbox of the e-mail client. The plug-in counts the number outgoing e-mail to particular e-mail addresses and stores these values. The count can be totaled for a rolling time period, such as the last 7 days, last month, last 2 months, last 3 months, or other time period. The time period can be user defined. These e-mail addresses are sorted according to the number of outgoing e-mails. Then, the news alerts are prioritized based on the e-mail addresses for those people who are ranked higher in the sort.

In alternative implementations, instead of monitoring the outbox and outgoing e-mails, outgoing phone calls (such as a mobile app on a smartphone can monitor), incoming phone calls, scheduled meetings, appointments, incoming e-mails, instant messaging, SMS messaging, and other interactions with people, and combinations of these. When a combination of contacts is used, the system can give weighting to the type of contact for prioritizing the news alerts. Although desktop client has been described, the technique can be applied to web-based and other types of e-mail. Further, an SMTP (or IMAP) or Microsoft Exchange server can be monitored for e-mail.

In an implementation, a monitoring application is executing on a server outside a company's firewall, monitoring e-mails of the company (such as via the outgoing Internet line or at the Internet Service Provider (ISP) link). To preserve confidentiality of the company, the monitoring application will not look at the contents or body of the e-mail, but will look at the sender and recipient address or name and also the date and time of the e-mail. Then the monitoring application will log the numbers of outgoing (or possible incoming) e-mails. The list of e-mail addresses is stored and sorted based on numbers received (or sent). The addresses with the largest number will be given higher priority for news alerts than those lower in the sorted list. As discussed above, the sorted list can be based on a rolling time period, so the more recent information is favored over older information. In other implementations, the monitoring application can be executing on a server inside a company's firewall.

In an implementation, the system includes a dossier function for attendees of a meeting. For example, if the system detects an e-mail for a meeting invitation, the system can prepare information for the user on the attendees of the meeting. This can include the attendee's profile generated by the system, as well as recent news events with the attendee.

In another example, for a browser application program, the system collects links selected by the user (e.g., links to profile pages of a user, links to organizations, or to other Web sites associated with an entity tracked by the system). For an instant messaging program, the system collects messages sent and received by the user.

A prioritization module 1209 determines a priority ranking for users. The system can use a variety of methods to generate the user priority ranking. In an implementation, if the system collects user interactions with a person A more than a person B (e.g., a user sends more e-mail to person A than person B), then person A would be a higher rank than person B in the priority ranking. In another implementation, the system determines the priority ranking by determining a weight for each contact based on a sum of weights of each correspondence from each contact in the user's mailbox. The system does this by assigning each correspondence (e.g., e-mail, instant message, phone call) a strength or weight. This weight is determined by a variety of factors such as analyzing contents of the e-mails. Some contents the system can analyze include: the recency of the correspondence, the nature of the correspondence (e.g., was this a meeting invitation, was meeting optional, was the e-mail sent to the contact or received from the contact, was the user carbon copied on e-mail, or was the user blind carbon copied on e-mail), or how many others were included in the e-mail. The priority ranking is transmitted to the news alert system, where it is stored 1211.

Figure 13:
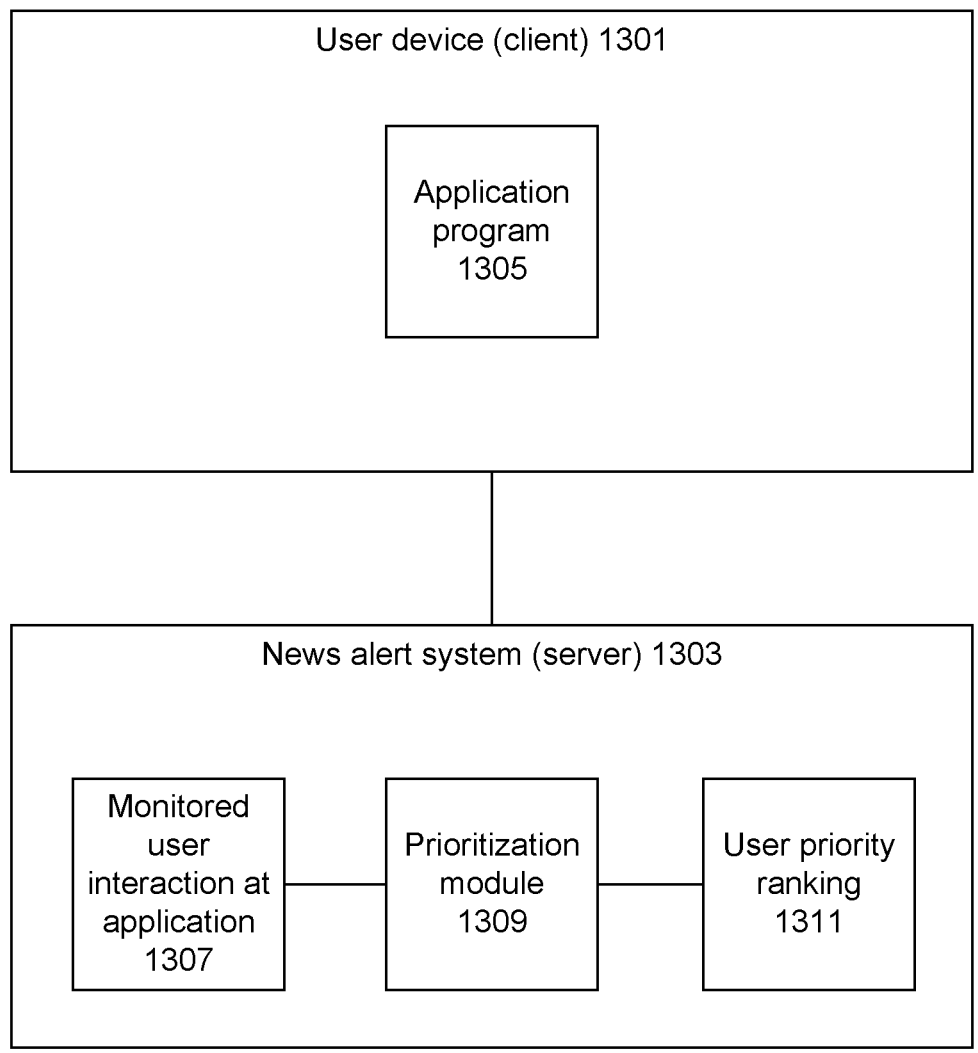
FIG. 13 shows a prioritization module for a news alert system executing on a server.

FIG. 13 shows a prioritization module for a news alert system executing on a server. A user device 1301 is connected to a news alert system 1303. An application program 1305 executes on the user device. The application program can be any type of application program, as discussed in greater detail elsewhere in this application. When the user interacts with the application program 1307, the interactions are transmitted to the server 1303. The server collects the information on the user's interactions 1307. For example, if the application program 1305 is an e-mail client, the news alert system can include an e-mail server (e.g., Microsoft Exchange Server, Sendmail, Novell GroupWise, or other e-mail server). The system monitors the e-mails sent by the application program 1305 to the e-mail server, to identify relevant information from the e-mail (e.g., recipient, time, sender, or other information). A prioritization module 1309 processes this information to create a priority ranking and stores the priority ranking in the system 1311.

Figure 14:
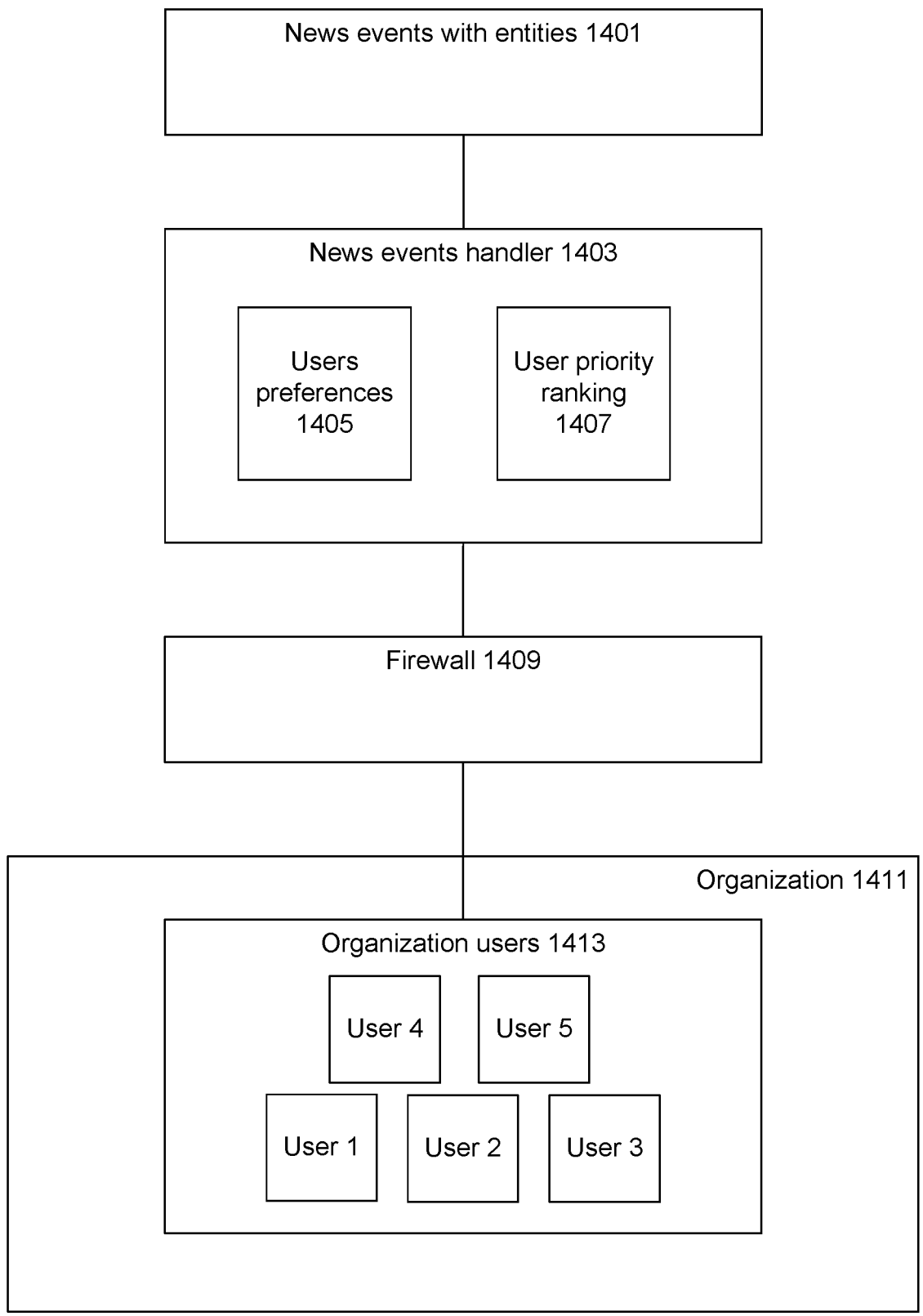
FIG. 14 shows a news alert system operating outside of a firewall.

FIG. 14 shows a news alert system operating outside of a firewall. News events with entities 1401 are transmitted to a news events handler 1403. The news events with entities can include a variety of information for each news event. In an implementation, news events have entities extracted from each news event. For example, a news article discussing the increase in stock prices for Microsoft Corp. that references Bill Gates and his nonprofit work will include identifiers for Microsoft Corp., the Bill & Melinda Gates Foundation, and Bill Gates. Other information a news event can contain are the body of a source text (e.g., the full article from a news article, full press release, or other), headline for a news event, or abstract.

The handler includes users preferences 1405 and user priority ranking 1407 modules. This allows the handler to generate news alert messages for users of the system, based on each user's preferences and format the news alert message according to the priority ranking of the news.

The handler transmits the news alert messages through a firewall 1409. Typically, organizations include the firewall to control the incoming and outgoing network traffic by analyzing the data packets and determining whether they should be allowed through or not. The firewall can be a hardware or software type firewall. The firewall allows the news alert message through to the organization 1411 and to the organization's users 1413. The organization has multiple users, such as user 1, user 2, user 3, user 4, and user 5, and possibly many more.

Figure 15:
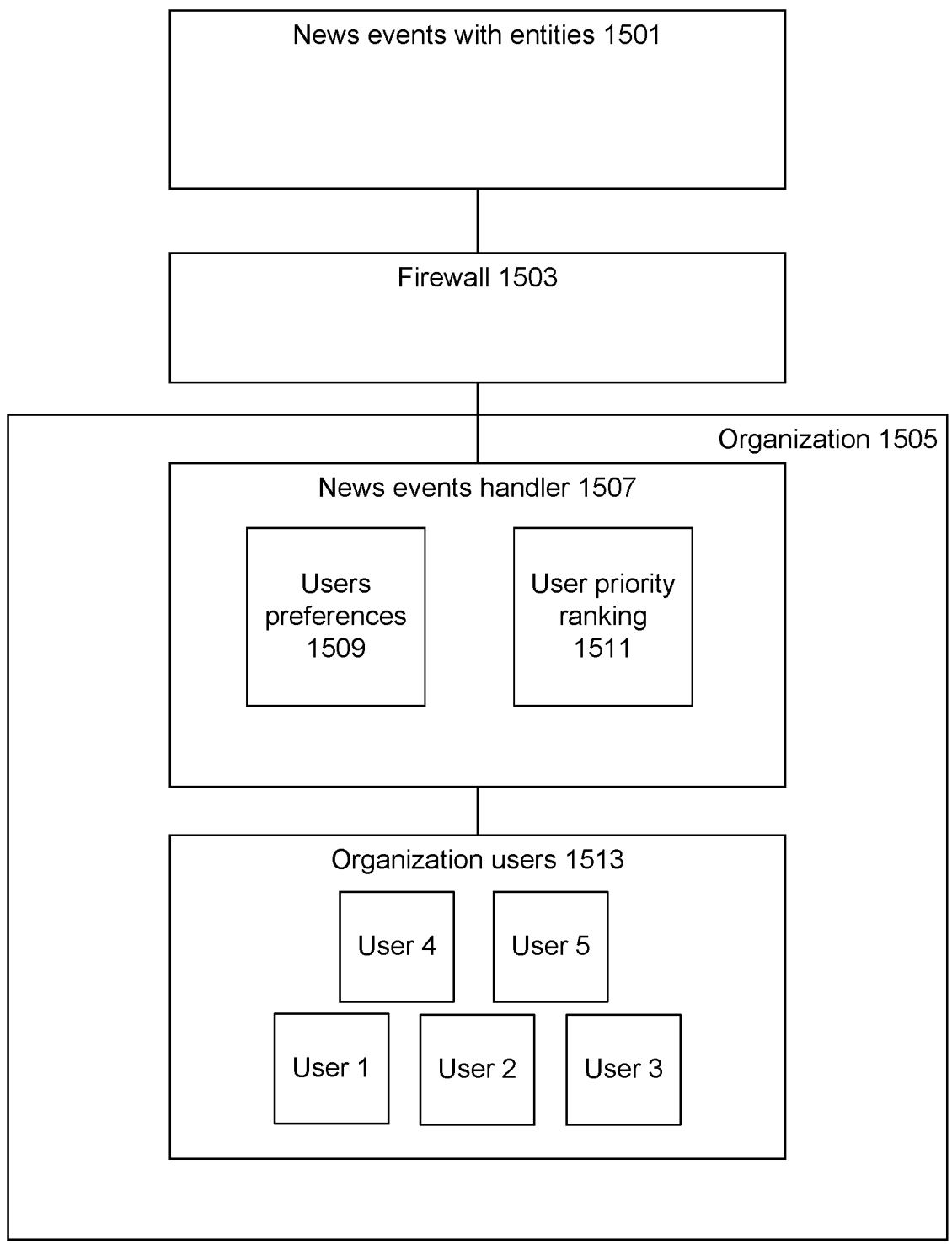
FIG. 15 shows a news alert system operating inside a firewall.

FIG. 15 shows a news alert system operating inside a firewall. A feature of the system is that it can operate standalone, inside of a company's firewall. It is very important for some companies to keep secret what their employees are doing and who they are contacting. These may be, in part, to meet governmental laws or regulations or professional responsibilities. For instance, financial firms doing due diligence on a company before an acquisition do not want others to know that this is taking place. This data can be used by others for profit, such as by purchasing a presale stake in the stock of the company. The system can operate while minimizing this risk, by allowing the system to distribute prioritized news alerts while keeping communications within a company secret within the company's firewall.

News events with entities 1501 are transmitted to a firewall 1503. The firewall allows these news events to the organization 1505 and to the news events handler 1507. Some organizations can have more than one firewall (e.g., a VPN for logon, network monitor, installed on user computers, or other firewalls). The news events handler generates news alert messages for users of the system, based on each user's preferences and format the news alert message according to the priority ranking of the news based on a users preferences 1509 and user priority ranking 1511 modules.

In an implementation, the system determines which are related entities to entities related to entities listed in the user's preferences (e.g., entities the user wants to track). As discussed in greater detail elsewhere in this application, the related entities feature allow the system to include entities that are closely related to tracked entities in news alerts. For example, news events regarding a target person's spouse is included with a listing of news events for the target person. These news alert messages are transmitted to the organization users 1513.

In an implementation, the length of the path between two nodes are the degree of separation between the nodes. For example, in a graph where nodes A and B are connected, A and B are connected through a first degree of separation. In a graph where nodes A to B to C are connected, A and B are connected through a first degree of separation, and A and C are connected through a second degree of separation. Although various degrees of separation are discussed, a system of the invention can be implemented allowing any number of degrees of separation, one, two, three, four, five, six, seven, eight, nine, ten, or more. A system implementation has one degree of separation.

In an implementation, the system includes an option to interface with a user's calendar application. This calendar can be a web-based calendar system (e.g., Google Calendar, Apple Calendar, Yahoo! Calendar, or others) or an application based e-mail system (e.g., Outlook, Thunderbird's Lightning extension, or others). The system will scan the calendar and create a dossier for the user with information on persons who are attending, speaking, or hosting the user's calendar events. This dossier can include recent news events related to these persons, information on the user's last meeting with these persons, or other information. This dossier can be delivered by e-mail to the user. With this dossier, the user will be better able to nurture their relationships with their contacts.

In an implementation, the system tracks contacts or connections the user has to persons or other entities not explicitly tracked by the system. This includes entities not represented in a social graph of the system. This allows the system to flexibly define who users are connected to and would want news or updates about.

For example, if the system has determined that a user has sent an e-mail to Jane, the system processes this to make information (e.g., news alerts, e-mail digests, news digests, or other communications) from the system more meaningful to the user. This may mean the system can extract Jane's information from metadata or other information associated with the e-mail. Some examples of information associated with the e-mail the system can use are the e-mail server Jane sends e-mail from, Jane's signature block, e-mail domain extension, or other identifying information. This associated information allows the system to process and deduce relationships Jane may have to tracked entities (or similar entities) of the system. So when similar entities appear in the system (e.g., appear in news events, calendar event, or other), the system will be able to include these news events or other information to the user by virtue of the user's connection to Jane.

An example flow of operation for this feature follows:

(1) A user sends an e-mail to John. John is not a person tracked by the system.

(2) The system intercepts the e-mail and extracts information from the e-mail. In this case, John's e-mail includes a domain for Widgets4u Inc. (i.e., john@widgets4u.com).

(3) The system associates John and Widgets4u Inc as a related entity to John.

(4) The system associates John as connected (or a latent connection) with the user, even though John is not tracked by the system.

(5) The system assigns a score value to the latent connection from John to the user. Depending on the closeness of the user and John (e.g., number of e-mails, length, reccency, and other factors), this score can be higher or lower.

(6) The system aggregates a total number of latent connections from John to users of the system. The system can process this information and, if there are a number of latent connections to John, John can be added as a tracked entity in the system.

Some specific flows for determining a technique of the invention are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figures 16A, 16B:
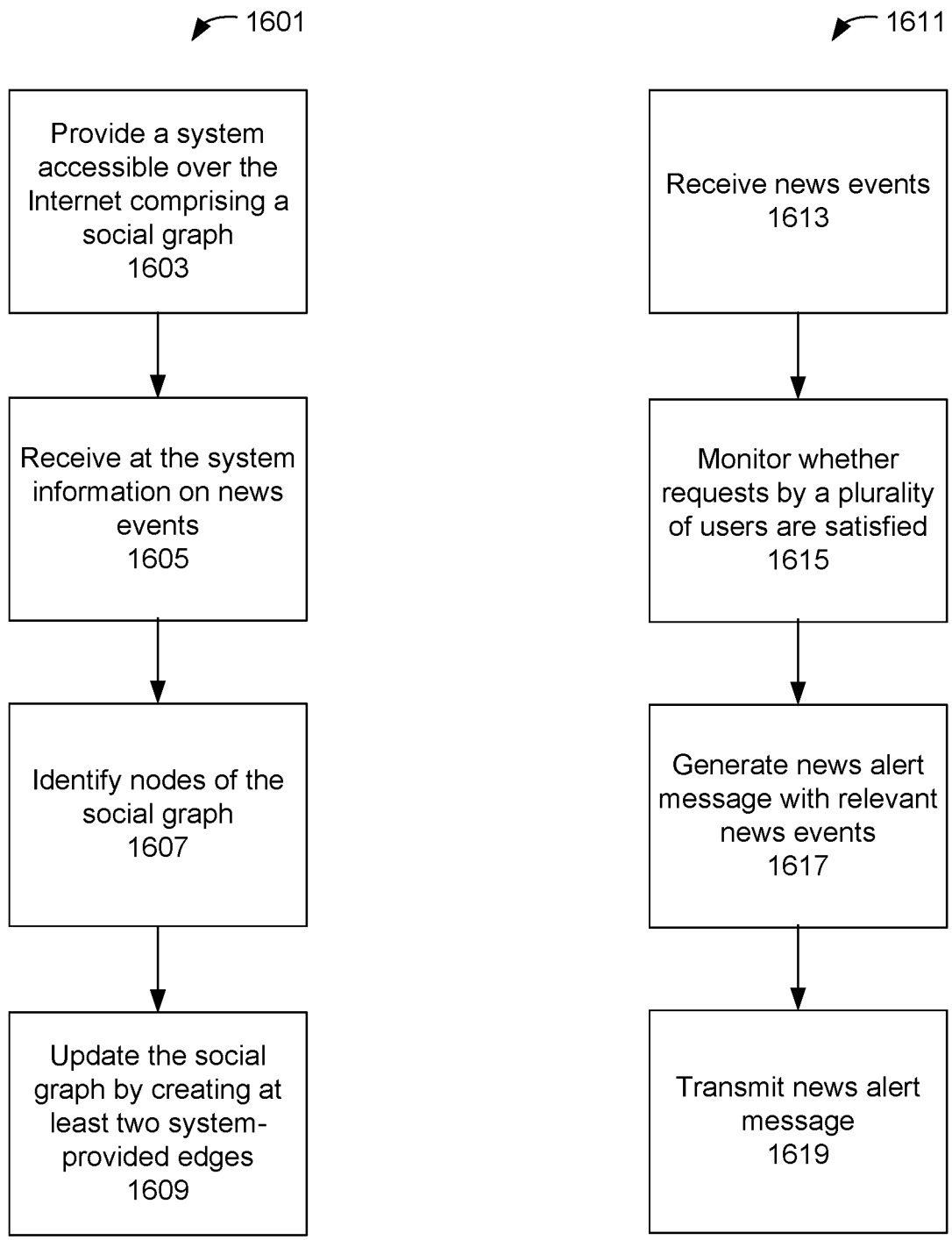
FIGS. 16A-16B shows flows of the system.

FIG. 16A shows a flow 1601 of the system. In a step 1603, the system is made accessible over the Internet including a social graph. The social graph includes two types of nodes and edges. In a step 1605, the system receives information on news events. This includes informations accessible over the Internet, such as government filings, news articles, and other sources. These news events are not user provided information. A news event can include more than one entity. In a step 1607, the system identifies nodes of the social graph. For example, the system includes algorithms to identify entities tracked by the system that are referred to in the news events. A news event can include more than one entity tracked by the system. In an implementation, each news event stored in the system includes at least two entities tracked by the system. In a step 1609, the system updates the social graph by creating at least two system-provided edges. System-provided edges are edges created by information gathered by the system, such as through the sources discussed above.

FIG. 16B shows another flow 1611 of the system. In a step 1613, the system receives news events. These news events can be entered into the system as nodes or edges in a social graph of the system. In a step 1615, the system monitors whether requests by users are satisfied. In an implementation, the system determines what entities to include in a specific user's news digest by a ghost edge (e.g., an edge established by the user) coupling the user's ghost node to the entities' system-provided node. In a step 1617, the system generates a news alert message with relevant news events for users of the system. This allows only selected news events and not all news events to be sent to specific users at a given time. This can include a prioritization and sorting methods in the news alert message. In a step 1619, the system transmits the news alert message. This can be done by e-mail, a Web page, or other methods.

In an implementation, the system creates equivalent structures to represent information in a social graph that is equivalent to real-world information. For example, to represent the relationship A is a parent of B in the social graph, an edge is created between nodes representing A and B. The edge has an edge type corresponding to being a parent. The edge can also be directional, to reflect that the node for A is parent of B, but not the other way around.

In an implementation, the system provides multiple options to receive updates on a target (e.g., as part of a news alert message). Three example options to receive updates on a target are discussed following:

(1) A piece of news is tagged by the system to the target. For example, the system continually crawls the Internet or other information sources, to determine whether new information on an entity already tracked by the system is available. When the system has added a new piece of information on the target, the system will notify the user.

(2) There is a new connection (or path) from the user to the target (e.g., connection found in research or during a data ingestion the system uncovers up new paths to the target).

(3) The user adds new connections to themselves in the system, which uncovers new paths to the target.

Figure 17:
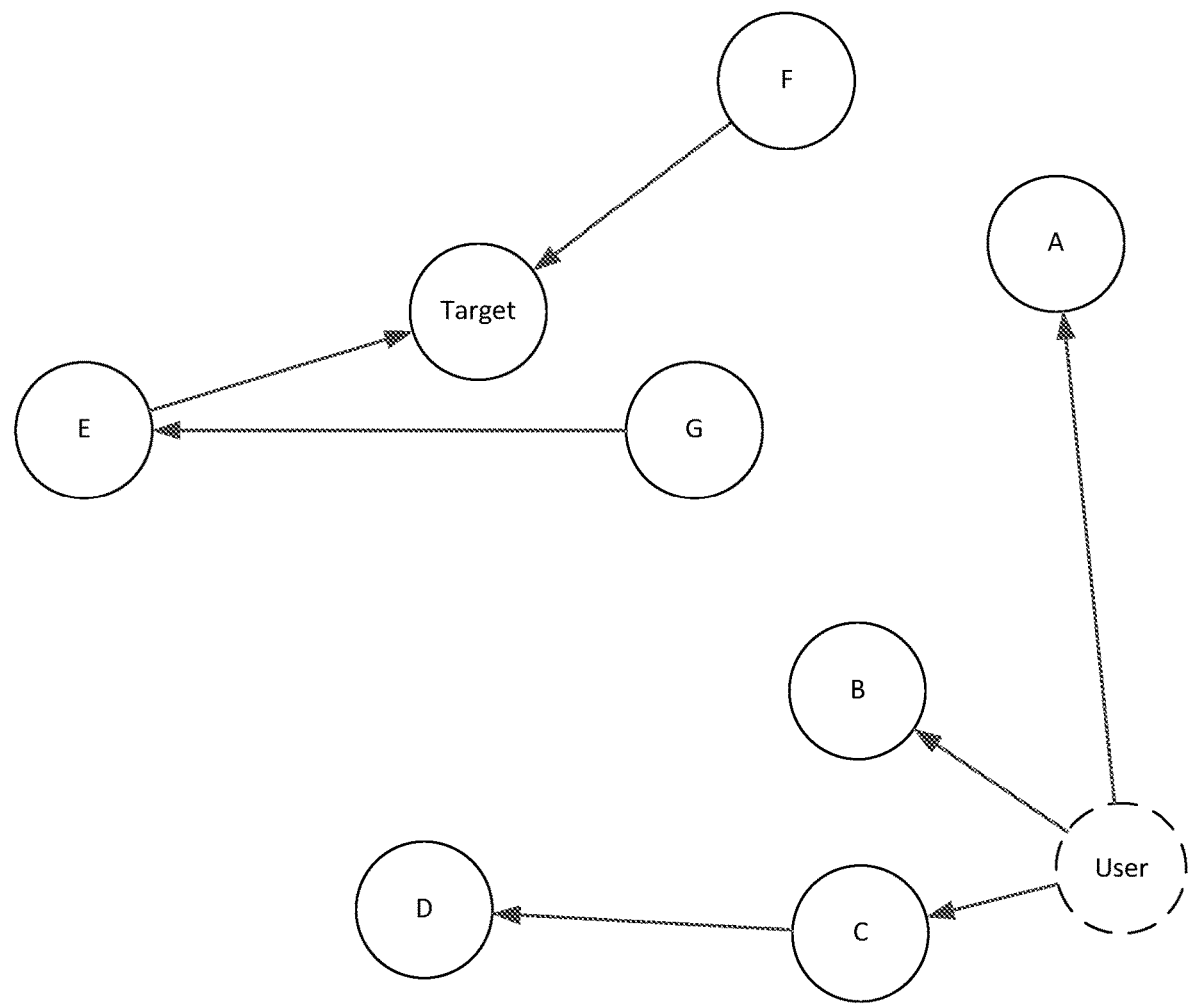
FIG. 17 shows an example of relationships stored in the system.
Figure 18:
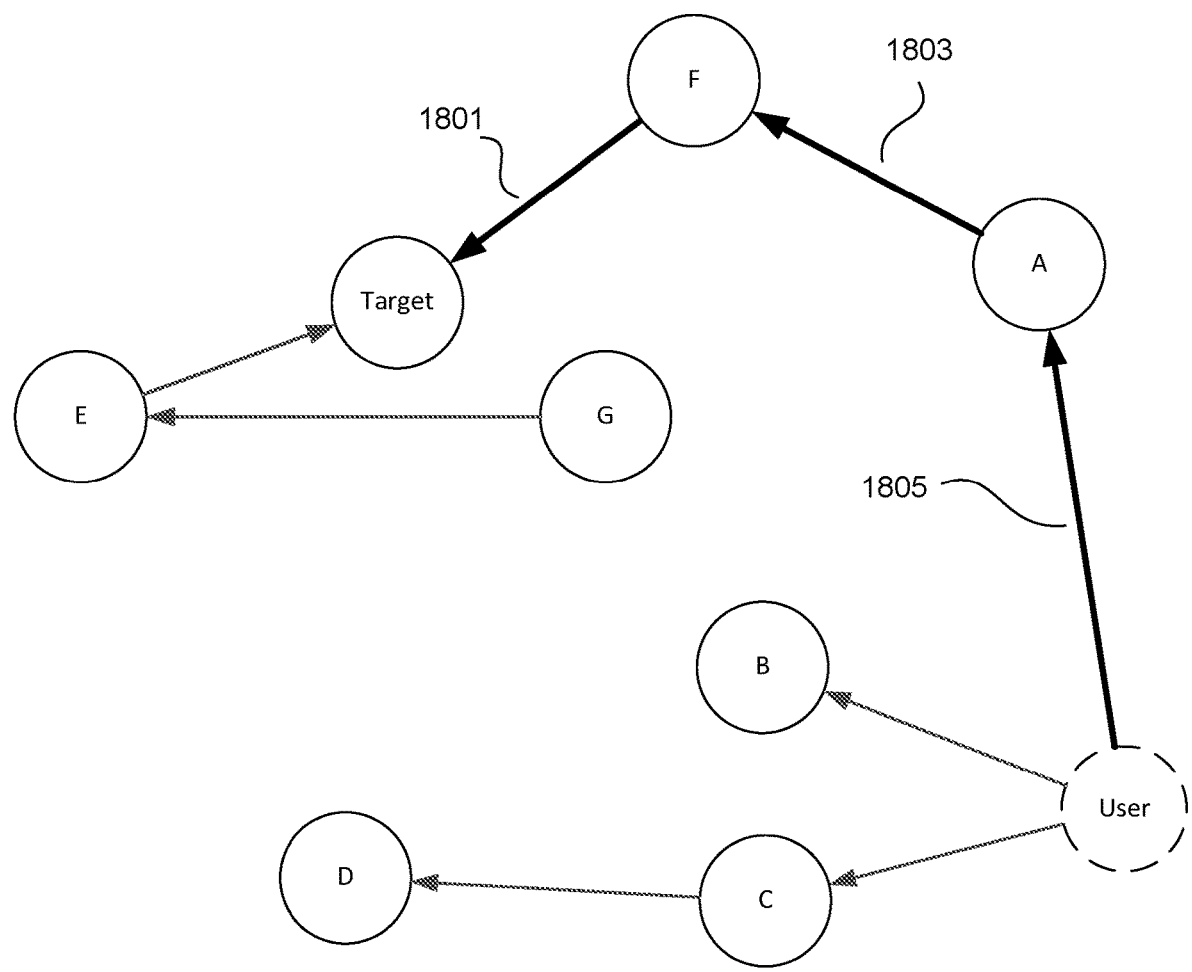
FIG. 18 shows the example of relationships stored in the system with a new relationship.

Options (1) and (2) are discussed further in reference to FIGS. 17 and 18. These figures shows an example of relationships stored in the system. A user is connected to entities A, B, C, and D (through C). These entities can be of any type of entity tracked by the system (e.g., person, organization, company, non-profit, or other entity tracked by the system). At this first time, there is no connection (or path) in the system from the user to the target. At a second time, the system has added a new connection. The system tags an article (e.g., news article, or other information source) to a Target, with a particular piece of information about the Target. The user now has more context about the Target, and information that he or she could use to reach out to the Target. Nodes A, B, C, D, E, F, and G can be system-provided nodes. This is shown by the Target, connected to E, F, and G (through E) by connections 1801, 1803, and 1805. In this example, a new edge that did not previously exist, 1803 is established.

Here, the system was able to determine that entity A is connected to entity F. The system can now notify the User that there is a path to the Target (e.g., path from User to A, A to F, and F to Target). With this information, the user is better prepared to reach out to the Target. In an implementation, the new connection can also reveal connections to other items stored in the system before the new connection is made. For example, a new connection can reveal that an entity is related to a piece of news, corporation, relationships, or any other type of entity stored in the system.

In an implementation, watches established by users of the system access the graph database, but not an information database of the system. The information database of the system stores data on entities of the system. So, when the graph database is determined to satisfy a watch, the system accesses equivalent entities stored in the information database, to retrieve and show information relevant to the watch (e.g., what the connection satisfying the watch is, how the entities satisfying the watch are related, relevant information on the entities satisfying the watch, and other information).

In an implementation, a user can designate a watch between two entities is only satisfied when a specified relationship type is met. Since the system is flexible in the kinds of relationships it stores, users can select which relationship types entered into the system are met before the watch is satisfied. In an example, if a user knows that a first entity is already connected to a second entity by an employment relationship, the user can request the system to notify that a watch is satisfied when any other relationship is established in the system. This means that, although there is a connection (e.g., an edge) between the first and second entities in the system (e.g., employment relationship), the system's watches can be relationship type sensitive. In another example, if a user knows that a first entity is already connected to a second entity by a relationship, the user can request the system to notify that a watch is satisfied when another relationship is established between the entities.

A watch can be satisfied in a variety of methods using the system. For example, the system can detect new edges created in the social graph, information is added to an edge, information is removed from an edge, information is updated to an edge, or other changes.

In an implementation, the system uses one or more methods to notify a user about news on a target. Some sample notification methods are having an e-mail sent to the user's personal e-mail box, having an e-mail notification sent to the user's mailbox in the system, appear on a homepage of the system when the user logs on, appear on the Target's profile page when the user views their page, or other methods.

Two sample use cases of the system follow:

Use Case 1

A user gets an e-mail from John, who is a lawyer working with Widgets Inc. The system can include with the e-mail news events about John and his related entities. The system displays this information in a variety of ways, such as: being appended in the e-mail (e.g., at the end, beginning, or elsewhere in the e-mail); using a sidebar in the e-mail viewer (e.g., a side toolbar, pop-up toolbar); link to a Web page (e.g., included in the e-mail body, pop-up window); display an alert using an application installed on the user's device; or some other method. With this additional knowledge, the user can respond to John's e-mail in a very intelligent and relationship building way. For example, instead of just being able to say "In response to your question, I believe . . . ," the user can also add "By the way, congratulations on your firm's successful representation of Widgets Inc. in their lawsuit." This is an example of information that the system can feed to its users, in context, and when they can use it most.

Use Case 2

A user looks up John's contact information (e.g., mailing address, e-mail address, phone number) to contact him. The system includes in this look up news events regarding John and his related entities. So, the user can e-mail John about the matter that led to looking up his contact information, but can add relationship-enhancing personal touches. For example, the user may include "Oh, and by the way, congratulations on winning that case for Widgets Inc.!"

Table 3 below provides a first example of an e-mail news alert broadcast by the system. The e-mail includes text (e.g., ASCII text), and can also include graphical elements (not shown) and hyperlinks. The e-mail news alerts will typically be different for each user, because the e-mail is customized or personalized for each user. The e-mail is customized in the sorting and listings shown. In a specific implementation, the news events included in the e-mail news alert are sorted by entity. Listed after the entity are news event articles related to a given entity. News event articles include any type of information gathered, sorted, or analyzed by the system. Some examples include printed newspapers, magazines, digital news, press releases, government filings, and many other types of news. This e-mail includes data update headlines that either explicitly mention the given entity or that relate to the entity by virtue of mentioning organizations and people to which the entity is connected (e.g., related entities).

In the first example below, listed are alerts relating persons 1-7 and organizations 1-3. These persons 1-7 have been identified or related entities (e.g., organizations) to the user in the system, which causes them to be listed. For each person, there will be recent news articles for that person. For example, for person 1, there is a headline 1 in the date 1 (e.g., Jul. 16, 2013) edition of the source 1 (e.g., New York Times, Wall Street Journal). There are other headlines 1-3 for person 1. The user can click on the headline and this links to the article within the system. Also, the listing for person 1 gives a line (e.g., "Person 2 is friends with Person 3") that indicates what caused a particular headline to be listed. This line can show a relationship between people or entities, as they are stored in the social graph of the system. This allows the user to more quickly recognize the significance of an article. Such e-mail alerts may be sent out periodically, such as a digest, once daily (or more or less frequently). In the examples included in tables 3-5, formatting is used to indicate different types of information. For example, italics represent information determined by the system based on news events (e.g., entities articles refer to, processed information). This includes entities, dates, amounts, counts, or other information determined by the system.

TABLE 3

First Sample E-mail Alert on Connections

Check out the latest headlines and updates to see what's new with your relationships and find out what your targets are up to. For the best experience, click here to view this digest on the site.

My Relationships 10 updates on 3 people
Person 1
News Related to Person 1
Headline 1
Date 1 Source 1
Person 1 is friends with Person 2
Headline 2
Date 1 Source 1
Person 1 is friends with Person 3
Headline 3
Date 1 Source 2
Person 1 is on the board of Organization 1
See 2 more articles related to Person 1>
Person 4
News Related to Person 4
Headline 4
Date 1 Source 3
Person 4 works at Organization 1
Headline 5
Person 4 is an investor in Organization 2
Date 1 Source 2
See 1 more article related to Person 4>
Person 7
News Related to Person 5
Headline 6
Date 1 Source 2
Person 5 works at Organization 3

TABLE 3-continued

First Sample E-mail Alert on Connections

Check out the latest headlines and updates to see what's new with your relationships and find out what your targets are up to. For the best experience, click here to view this digest on the site.

Competitors 3 updates on 1 organization
Organization 4
Headline 7
Date 1 Source 3
Headline 8
Date 1 Source 1

Table 4 below provides a second example of an e-mail news alert broadcast by the system. This example includes the automatic headline generator by the system, that extracts from different information sources to create a single headline. There is information important for users of the system, but not generally reported by traditional news sources (e.g., as a news headline) in a news article or press release. This means that, in many cases, there is no "headline" or title portion to extract a headline from. This can occur when the news event is contained within a news article, through government filings, filed information disclosures to public or private entities, or other. The system can create this headline using algorithms that extract relevant information and presents it in a concise format written in normal English. For example, in this e-mail the system has generated the headline "Person A invested in Widgets, Inc. on Date 1; the company now owns N/A." In this example, the system attempts to identify what percentage of the company the entity (here Person A) owns in Widgets, Inc. Since Person A is a person entity type, this percentage is not included. However, if the headline was for a holding company, private equity company, or other type of organization, the system can include this information with the e-mail. The system can search its existing entity information and calculate, based on the new information, what percentage the entity now owns in Widgets Inc. or other company or organization. To calculate this information, the system may need to determine an amount of outstanding or issued shares of a company to determine how much of the company the person owns. This is important for users of the system since this information indicates how much activity or interest someone has in an organization. If there is a trend in increasing holdings of a certain company, this can indicate that a person wishes to acquire board representation, a controlling holding, or outright purchase of a company. A user would be able to take advantage of this information, and use these details to gain a closer relationship with the person.

TABLE 4

Second Sample E-mail Alert on Connections

There are 6 new headlines available

Selected Headlines

Person A
Person A invested in Widgets Inc. on Date 1; the company now owns N/A
Date 1
Person B
Person B invested in Acme Inc. on Date 2; the company now owns N/A
Date 2

TABLE 4-continued

Second Sample E-mail Alert on Connections

There are 6 new headlines available

Person C
Person C invested in United Inc. on Date 1; the company
now owns N/A
Date 3
Excell Inc.
Person D is no longer serving as Senior Vice President at Excell Inc.
as of Date 4
Date 3
Person E
Person E is no longer serving as a Member of the Board of Directors
at Sunset Inc. as of Date 4
Date 3
Person F
News Article 1
Date 5: Source 1
. . . Included citation of article that includes reference of Person F . . .
Alert Summary My Relationships
5 Headlines on Person A, Person B, Person C and 2 others.
Competitors
1 Headline on Excell Inc.
See All 6 Headlines Table 5 below provides a second example of an e-mail news alert broadcast by the system. For example, in this e-mail the system has generated the headline "Person D sold $22.6M worth of shares in Excell Inc. in Date 5." In this example, the system determined this news event occurred from a government filing. A database of the system is updated to record this information and a news alert is created for users of the system.

TABLE 5

Third Sample E-mail Alert on Connections

There are 44 new headlines available

Selected Headlines

Person A
Person A invested in Acme Inc. on Date 1; the company
now owns N/A
Date 2
Widgets Inc.
Person B is now serving as President at Widgets Inc.
as of Date 3
Date 2
Person C
Person C invested in United Inc. on Date 4; the company
now owns N/A
Date 2
Person D, Excell Inc.
Person D sold $22.6M worth of shares in Excell Inc. in
Date 5
Date 2
Person E
Person E purchased $132M worth of shares in Sunset Inc.
in Date 5
Date 2
Person F, Person G 2 More Headlines
News Headline 1
Date 2 Source 1
. . . Included citation of article that includes reference of
Person H . . .
Person H
News Headline 2
Date 2 Source 2 (6+ months)
. . . Included citation of article that includes reference of
Person H . . .
Person H, 1 More Headline TABLE 5-continued Third Sample E-mail Alert on Connections There are 44 new headlines available News Headline 3
Date 2 Source 3 (6+ months)
. . . Included citation of article that includes reference of
Person I . . .
Person I
News Headline 4
Date 2 Source 4
. . . Included citation of article that includes reference of
Person J . . .
Person J
News Headline 5
Date 2 Source 5
. . . Included citation of article that includes reference of
Person K . . .
Person K
Alert Summary My Relationships
38 Headlines on Person A, Person C, Person E and 30
others.
Competitors
8 Headlines on Widgets Inc., Excell Inc., Access Inc.
See All 44 Headlines In an implementation, the system stores information in a social graph of the system. The social graph includes nodes of a first type, referred to as system-provided nodes. For nodes of this first type, they represent entities tracked by the system and represent information gathered by the system. As discussed in greater detail elsewhere, this includes information gathered by crawling the internet, from print sources, government filings, and other sources.

The social graph includes nodes of a second type, different from the first type of node and referred to as ghost (or user-provided) nodes. For nodes of this second type, they represent entities created for users of the system and include information specified by users of the system. This includes information entered by users such as whom they are, whom they know in the system, and other information.

The system-provided and user-provided nodes of the social graph are coupled by edges of a first or second type. The first type of edge, referred to as system-provided edges, represent relationships stored in the social graph with information gathered by the system. This information gathered by the system does not include information supplied directly to the system by users. The second type of edge, different from the first type of edge and referred to as ghost (or user-provided) edges, represent relationships from information provided by users to the system. In an implementation, nodes of the system are directly coupled by at least one of a system-provided or user-provided edge.

In an implementation, the system prevents users from including information in a social graph of the system if the information is to be associated with a user-provided node that does not represent the user. This includes adding, changing, or removing information stored in the system. For example, the system prevents user-provided or system-provided edges from being established by a first user if the first user is attempting to establish the edge to a second user, without coupling to the first user.

In an implementation, a social graph of the system is maintained by certain relationships. In a first relationship, the system allows system-provided nodes of the social graph to be directly coupled to other system-provided nodes by system-provided edges. In a second relationship, the system allows ghost nodes of the social graph to be directly coupled to system-provided nodes by ghost edges. In a third relationship, the system disallows ghost nodes from being directly coupled to other ghost nodes or to system-provided nodes using system-provided edges. In a fourth relationship, the system disallows system-provided nodes from being directly coupled to other system-provided nodes using ghost edges. The system can disallow relationships in the system using a variety of methods. In an implementation, the system includes rules that prevent the creation of disallowed relationships. In another implementation, the system highlights relationships that are disallowed and require system level users (e.g., system administrators) to review, approve, or modify disallowed relationships.

In an implementation, the system includes: receiving unfiltered information from an on-line source; filtering the unfiltered information to obtain information on entities; filtering the unfiltered information to obtain filtered information on entities; retrieving ontology data structures, where each ontology data structure of the ontology data structures include a method of representing a relationship in an unstructured data format to a data format of the social graph, where the data format of the social graph includes entities represented by at least one system-provided edge and at least two system-provided nodes; selecting ontology data structures from the ontology data structures to represent the filtered information on entities; and creating system-provided nodes and system-provided edges in the social graph to represented the filtered information on entities based on the selected ontology data structures.

The system can include where each ghost node of ghost nodes of a social graph is one-degree of separation from at least one system-provided node of the social graph. The system can include where none of the system-provided edges of the system-provided edges are directly coupled to a ghost node. The system can include none of the ghost edges of the ghost edges are coupled to more than one system-provided node. The system can disallow system-provided edges from directly coupling two ghost nodes or disallow ghost edges from directly coupling two ghost nodes or two system-provided nodes.

In an implementation, the system allows a user to modify information associated with a first ghost node, representing the first user, and disallowed to modify information associated with a system-provided node. The system can include where each ghost edge of a social graph is directly coupled to at least one ghost node. The system can include where each ghost edge of the social graph is directly coupled to at most one system-provided node. The system can include where each ghost node of the social graph is at least two degrees of separation from every other ghost node of the social graph. The social includes disallowing system-provided edges from directly coupling two ghost nodes and disallowing ghost edges from directly coupling two ghost nodes or two system-provided nodes. System-provided edge includes information accessible by the first user but prevented from specifying information on the first system-provided edge.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:
1. A method comprising:
providing a system accessible over the Internet comprising a social graph residing on a social graph database, wherein the social graph comprises:
computer data for a plurality of nodes of a first type, referred to as system-provided nodes, wherein system-provided nodes represent entities tracked by the system and include information gathered by the system;
computer data for a plurality of nodes of a second type, different from the first type of node and referred to as ghost nodes, wherein ghost nodes represent entities created for users of the system and include information specified by users of the system;
computer data for a plurality of edges of a first type, referred to as system-provided edges, wherein system-provided edges represent relationships categorized by at least one concept category of the system between two different system-provided nodes of the social graph; and
computer data for a plurality of edges of a second type, different from the first type of edge and referred to as ghost edges, wherein each ghost edge represents a relationship between a system-provided node and a ghost node of the social graph, information on relationships represented by the ghost edges are specified by users of the system, and the system-provided edges are disallowed from directly coupling two ghost nodes, and
a first ghost node represents a first user, and the first ghost node and any ghost edges coupled to the first ghost node are visible to the first user and not to other users;
receiving at the system information on a plurality of news events, wherein the news events comprise more than one entity tracked by the system and are not user-provided information;
accessing the social graph database to identify from the social graph first, second, and third system-provided nodes associated with the plurality of news events;
updating the social graph stored on the social graph database by creating at least two system-provided edges, and coupling the first and second system-provided nodes by a first system-provided edge and the first and third system-provided nodes by a second system-provided edge; and
monitoring whether requests by a plurality of users of the system, represented in the social graph as a plurality of ghost nodes, have been satisfied based on the first and second system-provided edges, comprising weights, and generating news alerts for users of the system.

2. The method of claim 1 wherein the generating news alerts for users of the system comprises:
transmitting news alerts including only relevant news events to specific users at a given time over the Internet.

3. The method of claim 1 wherein the news alerts comprise e-mail.

4. The method of claim 1 wherein the news alerts comprise short message service (SMS) messages.

5. The method of claim 1 comprising:
for the plurality of users, setting a plurality of indications stored on an indications database, wherein each indication is associated with the plurality of users and indicates the requests by the plurality of users of the system have been satisfied.

6. The method of claim 1 wherein the updating the social graph by creating at least two system-provided edges, and coupling the first and second system-provided nodes by a first system-provided edge and the first and third system-provided nodes by a second system-provided edge comprises:

receiving unfiltered information from an online source comprising the plurality of news events;

filtering the unfiltered information to obtain filtered information on entities;

retrieving a plurality of ontology data structures from an ontology database, wherein each ontology data structure of the plurality of ontology data structures includes a method of representing a relationship in an unstructured data format to a data format of the social graph, wherein the data format of the social graph comprises entities represented by at least one system-provided edge and at least two system-provided nodes;

selecting ontology data structures from the plurality of ontology data structures to represent the filtered information on entities; and creating system-provided edges in the social graph to represent the filtered information on entities based on the selected ontology data structures.

7. The method of claim 6 wherein the selected ontology data structures specifies a stock sale relationship.

8. The method of claim 1 wherein the first system-provided edge represents a first person serving on a board of a first organization.

9. The method of claim 1 wherein the generating news alerts for users of the system comprises:

transmitting news digests based on the news events over the Internet, wherein the news digests include news events relevant only to specific users at a given time.

10. The method of claim 1 wherein the requests by the plurality of users comprises:

selecting entities tracked by the system in the social graph, represented as system-provided nodes, by the plurality of users.

11. The method of claim 1 wherein the requests by the plurality of users comprises:

selecting entities tracked by the system in the social graph, represented as system-provided nodes, by the plurality of users, wherein for each selected entity by a user of the plurality of users, a system-provided node representing the selected entity is coupled to a ghost node representing the user.

12. The method of claim 1 wherein the news alerts comprises news events gathered from an electronic information source, accessible via the Internet.

13. The method of claim 1 wherein the news alerts comprises news events gathered from a government database, accessible via the Internet.

14. The method of claim 1 wherein each ghost node of the plurality of ghost nodes of the social graph has one-degree of separation from at least one system-provided node of the social graph.

15. The method of claim 1 wherein none of the system-provided edges of the plurality of system-provided edges are directly coupled to a ghost node.

16. The method of claim 1 wherein none of the ghost edges of the plurality of ghost edges are coupled to more than one system-provided node.

17. The method of claim 1 further comprising:

disallowing ghost edges from directly coupling two ghost nodes.

18. The method of claim 1 further comprising:

disallowing ghost edges from directly coupling two system-provided nodes.

19. The method of claim 1 wherein the news alerts are prioritized and sorted based on a preference of a specific user for which a news alert is intended.

20. The method of claim 1 wherein the news alerts are prioritized and sorted by a method comprising creating a priority ranking of news events in which to present news events in a news alert.

\* \* \* \* \*